US012664305B2

(12) United States Patent
Cameron

(10) Patent No.: US 12,664,305 B2
(45) Date of Patent: *Jun. 23, 2026

(54) ASSOCIATING DECENTRALIZED IDENTIFIERS WITH ONE OR MORE DEVICES

(71) Applicant: Microsoft Technology Licensing, LLC, Redmond, WA (US)

(72) Inventor: Kim Cameron, Toronto (CA)

(73) Assignee: Microsoft Technology Licensing, LLC, Redmond, WA (US)

( * ) Notice: Subject to any disclaimer, the term of this patent is extended or adjusted under 35 U.S.C. 154(b) by 5 days.

This patent is subject to a terminal disclaimer.

(21) Appl. No.: 18/938,151

(22) Filed: Nov. 5, 2024

(65) Prior Publication Data

US 2025/0061228 A1 Feb. 20, 2025

Related U.S. Application Data

(63) Continuation of application No. 17/793,911, filed as application No. PCT/US2021/015502 on Jan. 28, 2021, now Pat. No. 12,174,996.

(30) Foreign Application Priority Data

Jan. 30, 2020 (LU) .................................. LU101619

(51) Int. Cl.
*G06F 21/62* (2013.01)
(52) U.S. Cl.
CPC ................................ *G06F 21/6245* (2013.01)
(58) Field of Classification Search
CPC .................................................. G06F 21/6245

USPC ........................................................... 726/29
See application file for complete search history.

(56) References Cited

U.S. PATENT DOCUMENTS

| | | | | |
|---|---|---|---|---|
| 11,437,043 B1 * | 9/2022 | Peng | ........................ | G10L 17/12 |
| 11,695,547 B2 * | 7/2023 | Lim | .......................... | H04L 9/08 |
| | | | | 713/170 |
| 2011/0085665 A1 * | 4/2011 | Hong | ........................ | H04L 9/16 |
| | | | | 380/278 |
| 2014/0181513 A1 * | 6/2014 | Marek | ................... | H04L 63/105 |
| | | | | 713/168 |

(Continued)

FOREIGN PATENT DOCUMENTS

| | | |
|---|---|---|
| WO | 2014182957 A1 | 11/2014 |
| WO | 2019033394 A1 | 2/2019 |

OTHER PUBLICATIONS

First Examination Report Received for Indian Application No. 202217039797, mailed on Apr. 16, 2025, 07 pages.

(Continued)

*Primary Examiner* — Thanh T Le
(74) *Attorney, Agent, or Firm* — Workman Nydegger

(57) ABSTRACT

Generating and associating decentralized identifiers (DIDs) for a group of one or more related devices. First, a device group DID is generated. The device group DID is associated with a group of one or more related devices. For each of the group of one or more related devices, a device DID is generated, and associated with the corresponding device. A scope of permission is granted to the device group DID. In response to the granting the scope of permission to the device group DID, each device DID is granted a subset of the scope of permission.

20 Claims, 13 Drawing Sheets

1000

Generate A Device Group DID
1001

Add A Device To The Group
1007

Associate The Device Group DID With A Group Of Devices
1002

Removing A Device From The Group
1008

For Each Of The Group Of Device(s)

Derive A Device DID From The Device Group DID
1003

Associate The Device DID With The Corresponding Device
1004

Grant A Cope Of Permission To The Device Group DID
1005

Grant The Same Cope Of Permission To Each Device DID
1006

(56) References Cited

U.S. PATENT DOCUMENTS

| | | | |
|---|---|---|---|
| 2014/0233736 A1* | 8/2014 | Zhang | H04L 63/065 |
| | | | 380/270 |
| 2015/0003607 A1* | 1/2015 | Choi | H04L 63/065 |
| | | | 380/44 |
| 2016/0125416 A1* | 5/2016 | Spencer | G06Q 20/3829 |
| | | | 705/71 |
| 2016/0359965 A1* | 12/2016 | Murphy | H04L 67/1044 |
| 2017/0118015 A1* | 4/2017 | Kwak | G05B 15/02 |
| 2019/0028278 A1* | 1/2019 | Gilson | H04L 9/3239 |
| 2019/0109857 A1* | 4/2019 | Caffary, Jr. | H04W 12/069 |
| 2019/0132385 A1* | 5/2019 | Burba | H04L 67/1063 |
| 2019/0230073 A1 | 7/2019 | Patel et al. | |
| 2020/0052880 A1* | 2/2020 | Bathen | H04L 63/102 |
| 2020/0244657 A1* | 7/2020 | Iwase | H04L 63/104 |
| 2021/0044419 A1* | 2/2021 | Kim | H04L 9/0838 |
| 2021/0090578 A1* | 3/2021 | Trapp | G10L 17/24 |

OTHER PUBLICATIONS

Notice of First Office Action Received for Chinese Application No. 202180011649.1, mailed on Apr. 30, 2025, 20 pages (English Translation Provided).

Notice of Grant Received for Chinese Application No. 202180011649.1, mailed on Sep. 22, 2025, 07 pages. (English Translation Provided).

Intimation of Grant Received for Indian Application No. 202217039797, mailed on Apr. 6, 2026, 01 page.

* cited by examiner

Computing System
100

Processor(s)
102

Memory
104

Volatile

Non-Volatile

106

Communication
Channels
108

Network
110

UI 112

Output
112A

Input
112B

Database
505

206

DID Document 480

- Device Specific Public Key    408
- Group Specific Public Key     409
-   Recovery Method             465

400

Device 401

DID Management Module 420

Ownership Module 440

Recovery Module 460

Revocation Module 470

DID Creation Module 430

UI 435

Group DID 417

Device DID 416

Key Generation Module 450

Registrar 410

Device Group UI 500B

Group Name    530

530A

| Device Name 531 | Device Description 532 | Device Identifier 533 | Public Key 534 |
|---|---|---|---|
| Device A 535 | Mobile Phone 536 | Mac address 537 | 789ghi 538 |
| Device B 539 | Laptop 540 | Serial Number 541 | abc321 542 |

... 543

| Add A Device 544 | Remove A Device 545 | Recover A Device DID 546 |

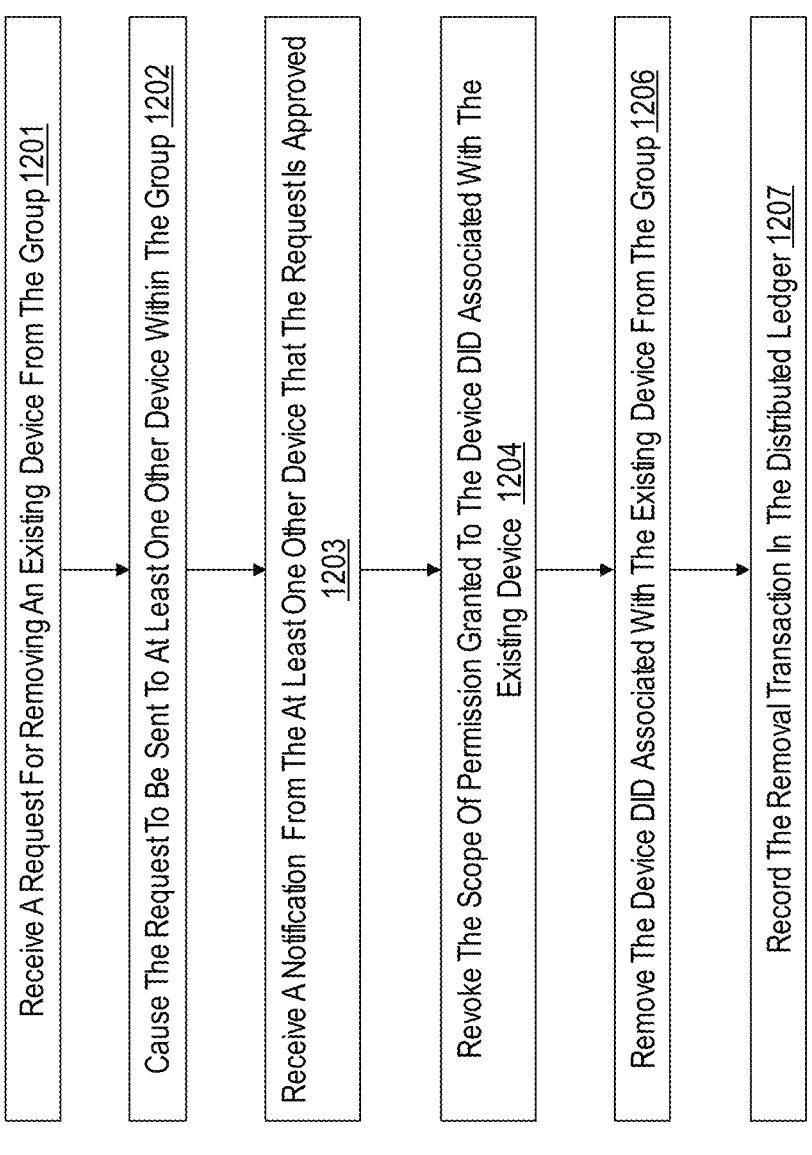

Receive A Request For Removing An Existing Device From The Group 1201

Cause The Request To Be Sent To At Least One Other Device Within The Group 1202

Receive A Notification From The At Least One Other Device That The Request Is Approved 1203

Revoke The Scope Of Permission Granted To The Device DID Associated With The Existing Device 1204

Remove The Device DID Associated With The Existing Device From The Group 1206

Record The Removal Transaction In The Distributed Ledger 1207

ASSOCIATING DECENTRALIZED IDENTIFIERS WITH ONE OR MORE DEVICES

CROSS-REFERENCE TO RELATED APPLICATIONS

The present application is a continuation of U.S. application Ser. No. 17/793,911, filed on Jul. 19, 2022, and entitled "ASSOCIATING DECENTRALIZED IDENTIFI- ERS WITH ONE OR MORE DEVICES," which is a U.S. National Stage of International Application No. PCT/ US2021/015502, filed on Jan. 28, 2021, designating the United States and claiming the priority of Luxembourg Patent Application No. LU101619 filed with the Luxem- bourg Patent Office on Jan. 30, 2020. All of the aforemen- tioned applications are incorporated herein in their respec- tive entirety by this reference.

BACKGROUND OF THE INVENTION

Most of the currently used documents or records that prove identity are issued by centralized organizations, such as governments, schools, employers, or other service centers or regulatory organizations. These organizations often main- tain every member's identity in a centralized identity man- agement system. A centralized identity management system is a centralized information system used for organizations to manage the issued identities, their authentication, authori- zation, roles and privileges. Centralized identity manage- ment systems have been deemed as secure since they often use professionally maintained hardware and software. Typi- cally, the identity issuing organization sets the terms and requirements for registering people with the organization. Finally, when a party needs to verify another party's identity, the verifying party often needs to go through the centralized identity management system to obtain information verifying and/or authenticating the other party's identity.

Decentralized Identifiers (DIDs) are a new type of iden- tifier, which are independent of any centralized registry, identity provider, or certificate authority. Distributed ledger technology (such as blockchain) provides the opportunity for using fully decentralized identifiers. Distributed ledger technology uses globally distributed ledgers to record trans- actions between two or more parties in a verifiable way. Once a transaction is recorded, the data in the section of the ledger cannot be altered retroactively without the alteration of all subsequent sections of the ledger, which provides a fairly secure platform. In such a decentralized environment, each owner of DID generally has control over his/her own data using his/her DID. The DID owner access the data stored in the personal storage that is associated with the DID via a DID management module, which is a mobile app, a personal computer, a browser, etc.

The subject matter claimed herein is not limited to embodiments that solve any disadvantages or that operate only in environments such as those described above. Rather, this background is only provided to illustrate one exemplary technology area where some embodiments described herein is practiced.

BRIEF SUMMARY

This Summary is provided to introduce a selection of concepts in a simplified form that is further described below in the Detailed Description. This Summary is not intended to identify key features or essential features of the claimed subject matter, nor is it intended to be used as an aid in determining the scope of the claimed subject matter.

Existing technology often associates decentralized iden- tifiers with users or personally identifiable information. For example, a DID is often associated with a user's driver's license. The user can use the DID, when it is associated with his or her driving license, to prove that he/she is authorized to drive. There is a desire to keep the public keys of DIDs of people secure and private. Thus, the public keys of such types of DIDs are generally not propagated onto a public blockchain, and the potential scope of use of such types of DIDs is substantially limited.

In various examples described herein there is technology for associating a DID with a device and/or a group of devices, instead of personally identifiable information, such that the DIDs (i.e., the device group DID and device DID) themselves are not deemed to contain any personally iden- tifiable information, and the public key of a device group DID or device DID would also not be deemed as personally identifiable information. As such, the public keys of the device group DIDs and device DIDs can be used in many services and be propagated onto ledgers that are publicly accessible. Associating a DID with a device and/or group of devices is not straightforward and examples of technology to achieve this are described herein.

In particular, the principles described herein not only allow users to use ledgers that are publicly accessible to manage multiple devices as a group, but also allow users to use these publicly accessible ledgers to manage one device via another device within the group without publicly expos- ing the user's personally identifiable information. It is advantageous to allow users to manage devices in a decen- tralized manner using publicly available ledgers, because the users will not depend on a particular centralized service to perform various management functions on the group of devices or a particular device. The user's personally iden- tifiable information is not only protected from the public, but also protected from the centralized service providers.

Additionally, when public keys are deemed as personally identifiable information (PII), the use of the publicly avail- able ledgers is substantially limited, because many services that can be provided via a decentralized system using public keys containing PII must be implemented via private ledgers that are available and maintained by private entities. The principles described herein remove personally identifiable information from public keys, such that the type of services that publicly accessible ledgers can implement are expanded while still protecting users' privacy.

Embodiments disclosed herein are related to generating and associating decentralized identifiers (DIDs) for a group of one or more related devices. First, a device group DID is generated. The device group DID is associated with a group of one or more related devices. Thereafter, for each of the group of one or more related devices, a device DID is generated, and associated with the corresponding device. A scope of permission is granted to the device group DID. In response to the granting the scope of permission to the device group DID, a subset of the scope of permission is granted to each device DID within the group. In this way an efficient and effective process for generating and associating DIDs with a group of one or more related devices is given. The scope of permission is carefully controlled in a manner to enhance security and privacy even though a group of devices is involved.

In some embodiments, the permission to add a new device to or remove an existing device from the group is a subset of the scope of permission granted to the device group DID.

At least one of the device DIDs is granted a permission to add new devices to or to remove existing devices from the device group.

In some embodiments, a new device is added to an existing group of one or more devices. When an indication that a new device is to be added to the group of one or more devices is received, the new device is verified with at least one permissioned existing device amongst the group of one or more devices. In response to the verification with the at least one permissioned existing device, the new device is added to the group of one or more devices. The act of adding the new device into the group of one or more devices includes deriving a new device DID, and associating the new device DID with the new device.

In some embodiments, a device in an existing group of one or more devices is removed. When an indication to remove a particular device amongst the group of devices, the removal of the particular device is verified with at least one permissioned existing device that is not the particular device amongst the group of devices. In response to the verification with at least one permissioned existing device, the particular device is removed from the group of devices. The act of removing the particular device from the group of devices include revoking all scope(s) of permission that has been granted to the device DID, and deactivating the device DID associated with the particular device.

In some embodiments, the act of adding or removing the particular device is recorded in the distributed ledger.

In some embodiments, a scope of permission includes a permission to access a storage at an identity hub. The identity hub is a storage of attributes including keys and metadata under the control of the holder of the DID. The permission includes a permission to perform at least one of the following: (1) reading a set of data stored at the storage, (2) writing a set of data into the storage, (3) copying a set of data stored at the storage, and (4) deleting a set of data stored at the storage.

In some embodiments, when a particular device amongst the group of devices requests to access the set of data stored at the ID hub, the device DID corresponding to the particular device and the device group DID corresponding to the group of devices are both verified.

Additional features and advantages will be set forth in the description which follows, and in part will be obvious from the description, or is learned by the practice of the teachings herein. Features and advantages of the invention is realized and obtained by means of the instruments and combinations particularly pointed out in the appended claims. Features of the present invention will become more fully apparent from the following description and appended claims, or is learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and details through the use of the accompanying drawings in which:

FIG. 5A illustrates an example user interface that displays a list of groups that a device is associated with;

FIG. 5B illustrates an example user interface that displays a list of devices within a particular group;

FIG. 12 illustrates a flowchart of an example method 1200 for removing a device DID from the group.

DETAILED DESCRIPTION

Figure 1:
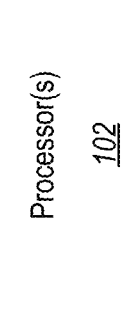
FIG. 1 illustrates an example computing system in which the principles described herein is employed.
Figure 1:
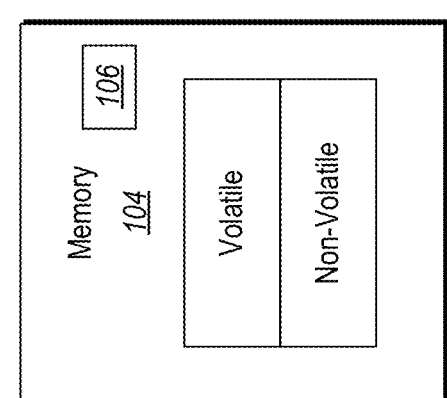

Embodiments disclosed herein are related to generating and associating decentralized identifiers (DIDs) for a group of one or more related devices. First, a device group DID is generated. The device group DID is associated with a group of one or more related devices. Thereafter, for each of the group of one or more related devices, a device DID is generated, and associated with the corresponding device. A scope of permission is granted to the device group DID. In response to the granting the scope of permission to the device group DID, a subset of the scope of permission is granted to each device DID within the group.

In some cases, the permission to add a new device to or remove an existing device from the group is a subset of the scope of permission granted to the device group DID. At least one of the device DIDs is granted a permission to add new devices to or to remove existing devices from the device group.

In some embodiments, a new device is added to an existing group of one or more devices. When an indication that a new device is to be added to the group of one or more devices is received, the new device is verified with at least one permissioned existing device amongst the group of one or more devices. In response to the verification with the at least one permissioned existing device, the new device is added to the group of one or more devices. The act of adding the new device into the group of one or more devices includes deriving a new device DID, and associating the new device DID with the new device.

In some embodiments, a device in an existing group of one or more devices is removed. When an indication to remove a particular device amongst the group of devices, the removal of the particular device is verified with at least one permissioned existing device that is not the particular device amongst the group of devices. In response to the verification with at least one permissioned existing device, the particular device is removed from the group of devices. The act of removing the particular device from the group of devices include revoking all scope(s) of permission that has been granted to the device DID, and deactivating the device DID associated with the particular device.

In some embodiments, the act of adding or removing the particular device is recorded in the distributed ledger.

In some embodiments, a scope of permission includes a permission to access a storage at an identity hub. The identity hub is a storage of attributes including keys and metadata under the control of the holder of the DID. In some cases, the permission includes a permission to perform at least one of the following: (1) reading a set of data stored at the storage, (2) writing a set of data into the storage, (3) copying a set of data stored at the storage, and (4) deleting a set of data stored at the storage.

In some embodiments, when a particular device amongst the group of devices requests to access the set of data stored at the ID hub, the device DID corresponding to the particular device and the device group DID corresponding to the group of devices are both verified.

Existing embodiments often associate decentralized identifiers with users or personally identifiable information. For example, a DID is often associated with a user's driver's license. The user can use the DID to prove that he/she is authorized to drive. There is a desire to keep the public keys of such types of DIDs private. Thus, the public keys of such types of DIDs are generally not propagated onto a public blockchain, and the potential scope of use of such types of DIDs is substantially limited. The principles described herein include associating a DID with a device and/or a group of devices, instead of personally identifiable information, such that the DIDs (i.e., the device group DID and device DID) themselves are not deemed to contain any personally identifiable information, and the public key of a device group DID or device DID would also not be deemed as personally identifiable information. As such, the public keys of the device group DIDs and device DIDs can be used in many services and be propagated onto public blockchains.

At the same time, personally identifiable information can still be stored in the identity hub and/or be presented with the device DIDs or device group DIDs as a verifiable claim. For example, a pairwise claim is issued to a predetermined list of one or more verifying entities. As such, since the personally identifiable information is merely contained in the verifiable claims, instead of the DID, it is very difficult to use the public keys of the device DIDs to trace back to any particular users.

Further, to provide additional privacy to DID users, some existing embodiments allow a user to generate and use a different DID to deal with a different entity, as such, each DID is only used between a pair of users. Such type of DIDs are sometimes called "pairwise" DIDs. In some other existing embodiments, a separate DID is generated with a different persona. Even though pairwise DIDs and DIDs for different personas improve privacy protection to the user, such embodiments require the user or the user's devices to manage and maintain a very large number of DIDs as time goes on. The principles described herein also mitigate the complication caused by having to manage a large number of DIDs for each user, because associating DIDs with group of devices and devices reduces the needs of generating a new DID frequently to deal with third-party entities. Additionally, the information contained in these pairwise DIDs is wrapped in a claim, and the claim is transmitted between two devices via secure communication, such that except the two devices and/or the device owners, the information contained in the claim needs not be propagated onto a public blockchain.

Because the principles described herein are performed in the context of a computing system, some introductory discussion of a computing system will be described with respect to FIG. 1. Then, this description will return to the principles of the DID platform with respect to the remaining figures.

Computing systems are now increasingly taking a wide variety of forms. Computing systems include, for example, handheld devices, appliances, laptop computers, desktop computers, mainframes, distributed computing systems, data centers, or even devices that have not conventionally been considered a computing system, such as wearables (e.g., glasses). In this description and in the claims, the term "computing system" is defined broadly as including any device or system (or a combination thereof) that includes at least one physical and tangible processor, and a physical and tangible memory capable of having thereon computer-executable instructions that can be executed by a processor. The memory can take any form and can depend on the nature and form of the computing system. A computing system can be distributed over a network environment and can include multiple constituent computing systems.

As illustrated in FIG. 1, in its most basic configuration, a computing system 100 typically includes at least one hardware processing unit 102 and memory 104. The processing unit 102 includes a general-purpose processor, a field-programmable gate array (FPGA), an application-specific integrated circuit (ASIC), and/or any other specialized circuit. In some cases, the memory 104 is a physical system memory, which is volatile, non-volatile, or some combination of the two. The term "memory" is also used herein to refer to non-volatile mass storage such as physical storage media. If the computing system is distributed, the processing, memory and/or storage capability is likely to be distributed as well.

The computing system 100 also has thereon multiple structures often referred to as an "executable component". For instance, memory 104 of the computing system 100 is illustrated as including executable component 106. The term "executable component" is the name for a structure that is well understood to one of ordinary skill in the art in the field of computing as being a structure that can be software, hardware, or a combination thereof. For instance, when implemented in software, one of ordinary skill in the art would understand that the structure of an executable component includes software objects, routines, methods, and so forth, that is executed on the computing system, whether such an executable component exists in the heap of a computing system, or whether the executable component exists on computer-readable storage media.

In such a case, one of ordinary skill in the art will recognize that the structure of the executable component exists on a computer-readable medium such that, when interpreted by one or more processors of a computing system (e.g., by a processor thread), the computing system is caused to perform a function. Such a structure is likely to be computer-readable directly by the processors (as is the case if the executable component were binary). Alternatively, the structure is structured to be interpretable and/or compiled (whether in a single stage or in multiple stages) so as to generate such binary that is directly interpretable by the processors. Such an understanding of example structures of an executable component is well within the understanding of one of ordinary skill in the art of computing when using the term "executable component".

The term "executable component" is also well understood by one of ordinary skill as including structures, such as hardcoded or hard-wired logic gates, that are implemented exclusively or near-exclusively in hardware, such as within a field-programmable gate array (FPGA), an application-specific integrated circuit (ASIC), or any other specialized circuit. Accordingly, the term "executable component" is a term for a structure that is well understood by those of ordinary skill in the art of computing, whether implemented in software, hardware, or a combination. In this description, the terms "component", "agent", "manager", "service", "engine", "module", "virtual machine" or the like can also be used. As used in this description and in the case, these terms (whether expressed with or without a modifying clause) are also intended to be synonymous with the term "executable component", and thus also have a structure that is well understood by those of ordinary skill in the art of computing.

In the description that follows, embodiments are described with reference to acts that are performed by one or more computing systems. If such acts are implemented in software, one or more processors (of the associated computing system that performs the act) direct the operation of the computing system in response to having executed computer-executable instructions that constitute an executable component. For example, such computer-executable instructions can be embodied in one or more computer-readable media that form a computer program product. An example of such an operation involves the manipulation of data. If such acts are implemented exclusively or near-exclusively in hardware, such as within an FPGA or an ASIC, the computer-executable instructions include hardcoded or hard-wired logic gates. The computer-executable instructions (and the manipulated data) are stored in the memory 104 of the computing system 100. Computing system 100 also contains communication channels 108 that allow the computing system 100 to communicate with other computing systems over, for example, network 110.

While not all computing systems require a user interface, in some embodiments, the computing system 100 includes a user interface system 112 for use in interfacing with a user. The user interface system 112 includes output mechanisms 112A as well as input mechanisms 112B. The principles described herein are not limited to the precise output mechanisms 112A or input mechanisms 112B as such will depend on the nature of the device. However, output mechanisms 112A might include, for instance, speakers, displays, tactile output, holograms and so forth. Examples of input mechanisms 112B might include, for instance, microphones, touchscreens, holograms, cameras, keyboards, mouse or other pointer input, sensors of any type, and so forth.

Embodiments described herein comprise or utilize a special purpose or general-purpose computing system including computer hardware, such as, for example, one or more processors and system memory, as discussed in greater detail below. Embodiments described herein also include physical and other computer-readable media for carrying or storing computer-executable instructions and/or data structures. Such computer-readable media can be any available media that can be accessed by a general-purpose or special-purpose computing system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: storage media and transmission media.

Computer-readable storage media includes RAM, ROM, EEPROM, CD-ROM, or other optical disk storage, magnetic disk storage, or other magnetic storage devices, or any other physical and tangible storage medium which can be used to store desired program code means in the form of computer-executable instructions or data structures and which can be accessed by a general-purpose or special-purpose computing system.

A "network" is defined as one or more data links that enable the transport of electronic data between computing systems and/or modules and/or other electronic devices. When information is transferred or provided over a network or another communications connection (either hardwired, wireless, or a combination of hardwired or wireless) to a computing system, the computing system properly views the connection as a transmission medium. Transmissions media can include a network and/or data links which can be used to carry desired program code means in the form of computer-executable instructions or data structures and which can be accessed by a general-purpose or special-purpose computing system. Combinations of the above should also be included within the scope of computer-readable media.

Further, upon reaching various computing system components, program code means in the form of computer-executable instructions or data structures can be transferred automatically from transmission media to storage media (or vice versa). For example, computer-executable instructions or data structures received over a network or data link can be buffered in RAM within a network interface module (e.g., a "NIC"), and then eventually transferred to computing system RAM and/or to less volatile storage media at a computing system. Thus, it should be understood that storage media can be included in computing system components that also (or even primarily) utilize transmission media.

Computer-executable instructions comprise, for example, instructions and data which, when executed at a processor, cause a general-purpose computing system, special purpose computing system, or special purpose processing device to perform a certain function or group of functions. Alternatively or in addition, the computer-executable instructions configure the computing system to perform a certain function or group of functions. The computer-executable instructions include, for example, binaries or even instructions that undergo some translation (such as compilation) before direct execution by the processors, such as intermediate format instructions such as assembly language, or even source code.

Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention is practiced in network computing environments with many types of computing system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, data centers, wearables (such as glasses) and the like. The invention also be practiced in distributed system environments where local and remote computing systems, which are linked (either by hardwired data links, wireless data links, or by a combination of hardwired and wireless data links) through a network, both perform tasks. In a distributed system environment, program modules are located in both local and remote memory storage devices.

Those skilled in the art will also appreciate that the invention is practiced in a cloud computing environment. Cloud computing environments are distributed, although this is not required. When distributed, cloud computing environments are distributed internationally within an organization and/or have components possessed across multiple organizations. In this description and the following claims, "cloud computing" is defined as a model for enabling on-demand network access to a shared pool of configurable computing resources (e.g., networks, servers, storage, applications, and services). The definition of "cloud computing" is not limited to any of the other numerous advantages that can be obtained from such a model when properly deployed.

The remaining figures discuss various computing system which correspond to the computing system 100 previously described. The computing systems of the remaining figures include various components or functional blocks that implement the various embodiments disclosed herein as will be explained. The various components or functional blocks are implemented on a local computing system or are implemented on a distributed computing system that includes elements resident in the cloud or that implement aspects of cloud computing. The various components or functional blocks are implemented as software, hardware, or a combination of software and hardware. The computing systems of the remaining figures include more or less than the components illustrated in the figures and some of the components are combined as circumstances warrant. Although not necessarily illustrated, the various components of the computing systems access and/or utilize a processor and memory, such as processor 102 and memory 104, as needed to perform their various functions.

Figure 2:
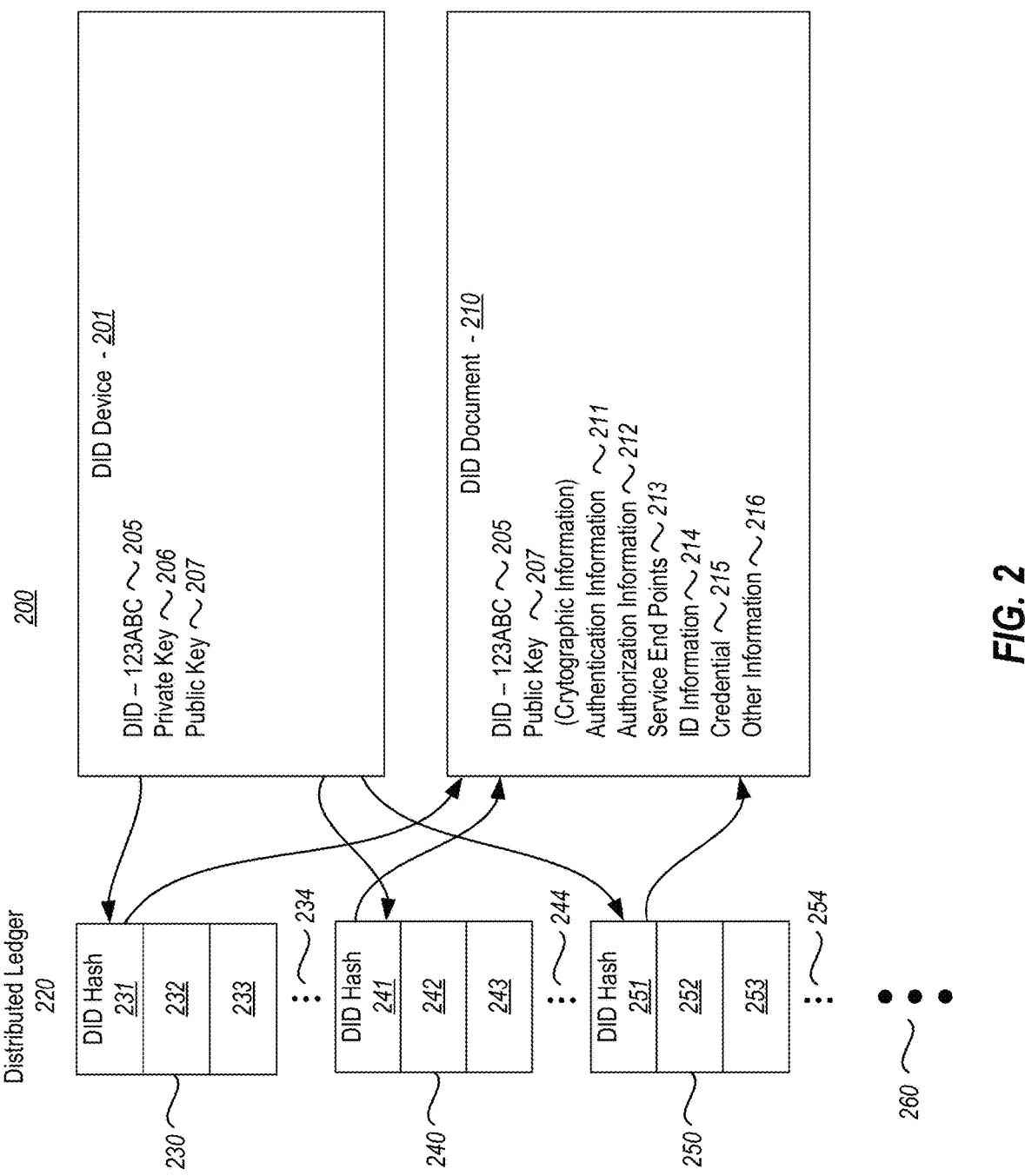
FIG. 2 illustrates an example environment for creating a decentralized identification or identifier (DID)

Some introductory discussions of a decentralized identification or identifier (DID) and the environment in which they are created and reside will now be given with respect to FIG. 2. As illustrated in FIG. 2, a device or a group of devices 201 is associated with a DID 205 that represents an identity of the device or the group of devices 201 (hereinafter also referred to as DID device). The DID device 201 is configured to register a DID using a creation and registration service, which will be explained in more detail below.

The DID device 201 includes any entity that could benefit from a DID. For example, The DID device 201 includes a machine, system, or device, or a collection of machine(s), device(s) and/or system(s). In still other embodiments, the DID device 201 is a subpart of a machine, system or device. For instance, a device could be a printed circuit board, where the subpart of that circuit board is individual components of the circuit board. In such embodiments, the machine or device has a DID and each subpart also has a DID. A DID device 201 might also be a software component such as the executable component 106 described above with respect to FIG. 1. An example of a complex executable component 106 might be artificial intelligence. In some embodiments, an artificial intelligence is also associated with a DID.

Further, although the DID device 201 is shown as having a single DID 205, this need not be the case as there can be any number of DIDs associated with the DID device 201 as circumstances warrant.

The DID device 201 is used by a human being or an organization of human beings. Such organizations might include a company, department, government, agency, or any other organization or group of organizations. Hereinafter, such human being users and/or organization users are referred to as users. In some embodiments, each individual human being users has a DID while the organization(s) to which each belongs might likewise have a DID.

As mentioned, the DID device 201 is configured to create and register the DID 205. The DID 205 is an identifier that is associated with the DID device 201. Preferably, that identifier is unique to that DID device 201, at least within a scope in which the DID is anticipated to be in use. In some cases, the identifier is locally unique, and perhaps more desirably a globally unique identifier for identity systems anticipated to operate globally. In some embodiments, the DID 205 is a Uniform Resource Identifier (URI) (such as a Uniform Resource Locator (URL)) or another pointer that relates the DID device 201 to mechanism to engage in trustable interactions with the DID device 201.

The DID 205 is "decentralized" because it does not require a centralized, third-party management system for generation, management, or use. Accordingly, the DID 205 remains under the control of the DID device 201. This is different from conventional centralized IDs based trust on centralized authorities and that remain under control of the corporate directory services, certificate authorities, domain name registries, or other centralized authority (referred to collectively as "centralized authorities" herein). Accordingly, the DID 205 is any identifier that is under the control of the DID device 201 and independent of any centralized authority.

In some embodiments, the structure of the DID 205 is as simple as a device name or some other human-understandable term. However, in other embodiments, the DID 205 is preferably a random string of numbers and letters for increased security. In one embodiment, the DID 205 is a string of 128 letters and numbers. Accordingly, the embodiments disclosed herein are not dependent on any specific implementation of the DID 205. In a very simple example, the DID 205 is shown as "123ABC".

As also shown in FIG. 2, the DID device 201 has control of a private key 206 and public key 207 pair that are associated with the DID 20. Because the DID 205 is independent of any centralized authority, the private key 206 should at all times be fully in control of the DID device 201. That is, the private and public keys should be generated in a decentralized manner that ensures that they remain under the control of the DID device 201.

As will be described in more detail to follow, the private key 206 and public key 207 pair is generated on a device controlled by the DID device 201. The private key 206 and public key 207 pairs should not be generated on a server controlled by any centralized authority as this cause the private key 206 and public key 207 pairs to not be fully under the control of the DID device 201 at all times. Although FIG. 2 and this description have described a private and public key pair, it will also be noted that other types of reasonable cryptographic information and/or mechanism can also be used as circumstances warrant.

FIG. 2 also illustrates a DID document 210 that is associated with the DID 205. As will be explained in more detail to follow, the DID document 210 is sometimes generated at the time that the DID 205 is created. In its simplest form, the DID document 210 describes how to use the DID 205. Accordingly, the DID document 210 includes a reference to the DID 205, which is the DID that is described by the DID document 210. In some embodiments, the DID document 210 is implemented according to methods specified by a distributed ledger 220 that will be used to store a representation of the DID 205 as will be explained in more detail to follow. Thus, the DID document 210 often has different methods depending on the specific distributed ledger.

The DID document 210 also includes the public key 207 created by the DID device 201 or some other equivalent cryptographic information. The public key 207 is used by third-party entities that are given permission by the DID device 201 to access information and data owned by the DID device 201. In some cases, the public key 207 is used by verifying that the DID device 201, in fact, is associated with or controls the DID 205.

In some cases, the DID document 210 also includes authentication information 211. The authentication information 211 specifies one or more mechanisms by which the DID device 201 is able to prove that the DID device 201 is associated with the DID 205. In other words, the mechanisms of authentication information 211 show proof of a binding between the DID 205 (and thus it's DID device 201) and the DID document 210. In one embodiment, the authentication information 211 specifies that the public key 207 be used in a signature operation to prove the ownership and/or association of the DID 205. Alternatively or in addition, the authentication information 211 specifies that the public key 207 be used in a biometric operation to prove ownership and/or association of the DID 205. Accordingly, the authentication information 211 can include any number of mechanisms by which the DID device 201 is able to prove that the DID device 201 is associated with the DID 205.

In some cases, the DID document 210 also includes authorization information 212. The authorization information 212 allows the DID device 201 to authorize third party entities the right to modify the DID document 210 or some part of the document without giving the third party the right to prove ownership and/or association of the DID 205. For example, the authorization information 212 allows the third party to update any designated set of one or more fields in the DID document 210 using any designated update mechanism. Alternatively, the authorization information 212 allows the third-party device to limit the usages of DID 205 by the DID device 201 for a specified time period. This is useful when the DID device 201 is a device of a minor child and the third-party device is a device of a parent or guardian of the child. The authorization information 212 allows the device of a parent or guardian to limit the use of the DID 201 until such time as the child is no longer a minor.

In some cases, the authorization information 212 also specifies one or more mechanisms that the third party will need to follow to prove they are authorized to modify the DID document 210. In some embodiments, these mechanisms are similar to those discussed previously with respect to the authentication information 211.

In some cases, the DID document 210 also includes one or more service endpoints 213. A service endpoint includes a network address at which a service operates on behalf of the DID device 201. Examples of specific services include discovery services, social networks, file storage services such as identity servers or hubs, and verifiable claim repository services. Accordingly, the service endpoints 213 operate as pointers for the services that operate on behalf of the DID device 201. In some cases, these pointers are used by the DID device 201 or by devices of third-party entities to access the services that operate on behalf of the DID device 201. Specific examples of service endpoints 213 will be explained in more detail to follow.

In some cases, the DID document 210 also includes various other information 216. In some embodiments, the other information 216 includes metadata specifying when the DID document 210 was created and/or when it was last modified. In other embodiments, the other information 216 includes cryptographic proofs of the integrity of the DID document 210. In still further embodiments, the other information 216 includes additional information that is either specified by the specific method implementing the DID document or desired by the DID device 201.

FIG. 2 also illustrates a distributed ledger or blockchain 220. The distributed ledger 220 includes any decentralized, distributed network that includes various computing systems that are in communication with each other. For example, the distributed ledger 220 includes a first distributed computing system 230, a second distributed computing system 240, a third distributed computing system 250, and any number of additional distributed computing systems as illustrated by the ellipses 260. In some cases, the distributed ledger or blockchain 220 operates according to any known standards or methods for distributed ledgers. Examples of conventional distributed ledgers that correspond to the distributed ledger or blockchain 220 include, but are not limited to, Bitcoin [BTC], Ethereum, and Litecoin.

In the context of DID 205, the distributed ledger or blockchain 220 is used to store a representation of the DID 205 that points to the DID document 210. In some embodiments, the DID document 210 is stored on the actually distributed ledger. Alternatively, in other embodiments, the DID document 210 is stored in a data storage (not illustrated) that is associated with the distributed ledger or blockchain 220.

As mentioned, a representation of the DID 205 is stored on each distributed computing system of the distributed ledger or blockchain 220. For example, in FIG. 2 this is shown as the DID hash 231, DID hash 241, and DID hash 251, which are ideally identical copies of the same DID. The DID hash 231, DID hash 241, and DID hash 251 then points to the location of the DID document 210. In some cases, the distributed ledger or blockchain 220 also stores numerous other representations of other DIDs as illustrated by references 232, 233, 234, 242, 243, 244, 252, 253, and 254.

In one embodiment, when the DID device 201 creates the DID 205 and the associated DID document 210, the DID hash 231, DID hash 241, and DID hash 251 are written to the distributed ledger or blockchain 220. The distributed ledger or blockchain 220 thus records that the DID 205 now exists. Since the distributed ledger or blockchain 220 is decentralized, the DID 205 is not under the control of any entity outside of the DID device 201. In some cases, the DID hash 231, DID hash 241, and DID hash 251 includes, in addition to the pointer to the DID document 210, a record or timestamp that specifies when the DID 205 was created. In some cases, at a later date when modifications are made to the DID document 210, this is also recorded in DID hash 231, DID hash 241, and DID hash 251. In some cases, the DID hash 231, DID hash 241, and DID hash 251 further include a copy of the public key 207 so that the DID 205 is cryptographically bound to the DID document 210.

Furthermore, unlike most of the existing implementation of DIDs, as illustrated in FIG. 2, the principles described herein introduces that the DID 205 is directly associated with a DID device 201, instead of any particular user. Accordingly, personally identifiable information of users is prevented from being publicly traceable to the DID 205, and additional privacy is provided to the users.

For example, in some existing embodiments, when a DID is associated with a user (hereinafter referred to as user DID), the DID document corresponding to the user DID often includes personally identifiable information in the identification information. The identification information includes personally identifiable information such as the name, address, occupation, family members, age, hobbies, interests, or the like of DID user. When such a DID is repeatedly used, even though the user DID does not include the precise identity of the user, a third party is still able to correlate the user DID with a particular user or to narrow down the user to be a user amongst a small number of users.

Unlike the user DIDs, the device DIDs 201 described herein solve the above problem by associating DIDs with devices, not users, so that the DIDs merely include device information, but not user information.

Further, certain government regulations prohibit organizations from making the personally identifiable information public. Such regulations prohibit decentralized service providers from recording user DIDs on public blockchains, and/or publishing transactions including user DIDs. However, since device DIDs 201 generally do not contain any personally identifiable information, such device DIDs 201 are less likely to be subject to such government regulations. As such, implementing device DIDs 201 allows decentralized service providers to provide a broader range of services to the users.

Additionally, the principles described herein also simplifies the decentralized system by reducing the necessary number of DIDs generated and managed for each user. For example, in some existing embodiments, to further protect the user's identity, a separate DID is generated to deal with a different party, i.e., each DID is only used between a pair of users. Such type of DIDs is sometimes called "pairwise" DIDs. In some other existing embodiments, a separate DID is generated with a different persona. The pairwise DIDs and DIDs for different personas improve privacy protection to the user. However, such embodiments require the user or the user's device to manage and maintain a very large number of DIDs as time goes on.

The principles described herein also aim to solve the problems that are caused by large growing numbers of DIDs. Since the device DID 205 generally does not include personally identifiable information, there is no need for a new DID to be generated for dealing with each different device, and a same device DID 205 can be used repeatedly to communicate with multiple other devices and still protect the user's privacy. Note, however, it is not necessary that each device only has one DID. Each device can still have multiple DIDs. Further details of how a device is associated with one or more DIDs are discussed with respect to FIG. 3 below.

Figure 3:
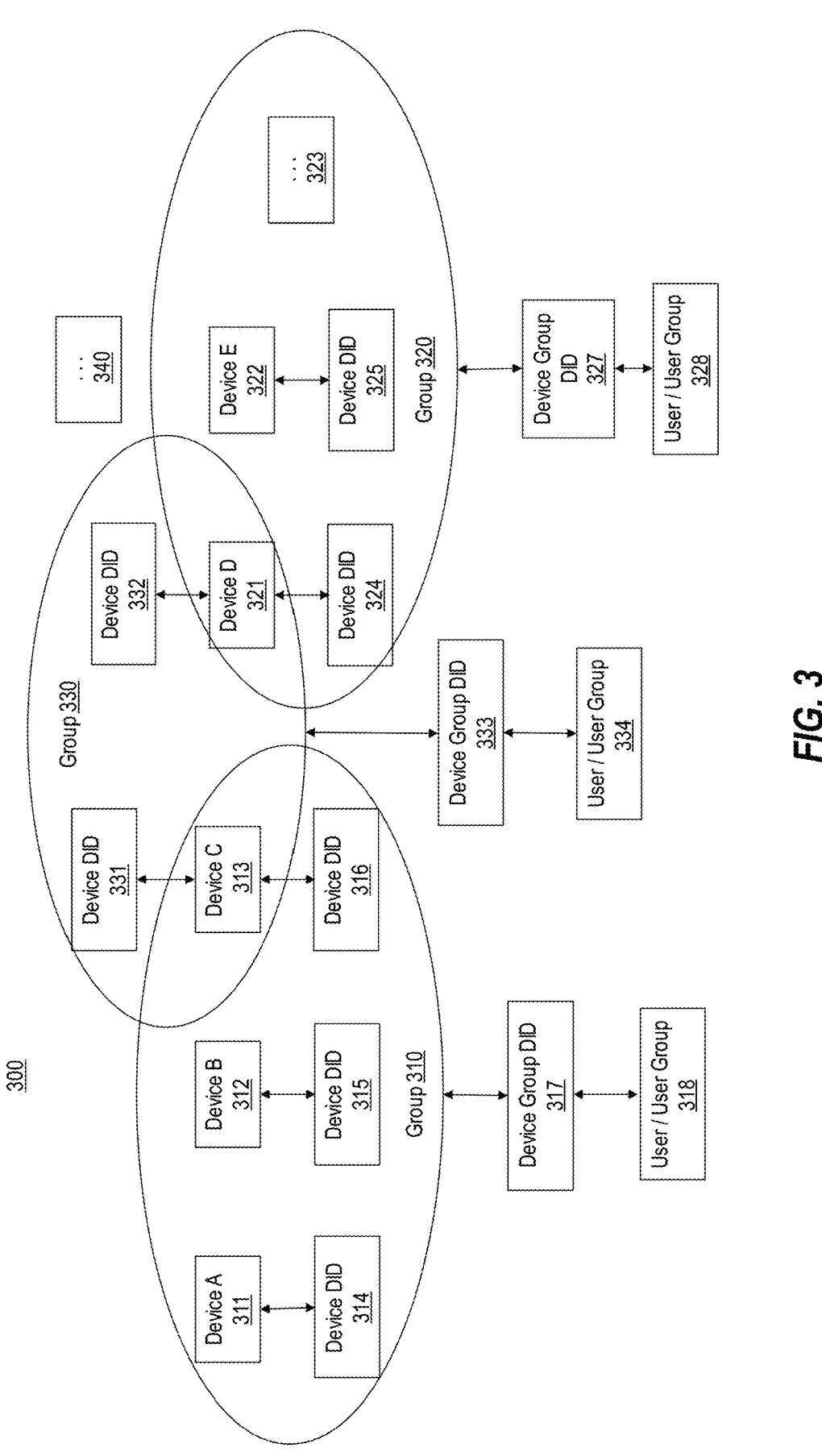
FIG. 3 illustrates an example environment, in which a DID is associated with a device or a group of devices.

FIG. 3 illustrates an example environment 300, in which DIDs are associated with a device or a group of devices. The environment 300 includes multiple groups of devices, including group 310 of devices, group 320 of devices, and group 330 of devices, each of which is associated with a DID (hereinafter referred to as device group DID). Group 310 of devices is associated with device group DID 317, group 320 of devices is associated with device group DID 327, and group 330 is associated with device group DID 333. The ellipsis 340 represents that there can be any number of additional groups of devices in the environment 300.

Each group of devices is used by a corresponding user or a user group. For example, group 310 of devices are used and/or owned by user/user group 318, group 320 of devices is used and/or owned by user/user group 328, and group 330 of devices is used and/or owned by user/user group 334. As briefly discussed with respect to FIG. 2, a "user" is a human being or an organization. An organization include a group of human beings, a company, department, government, agency, or any other organization or group of organizations.

Each group of devices includes multiple related devices. For example, group 310 includes device A 311, device B 312, and device C 313, each of which is associated with a device DID. For example, device A 311 is associated with device DID 314, device B 312 is associated with device DID 315, and device C 313 is associated with device DID 316. User 318 can be a person, who owns the group 310 of devices. User 318 owns various different devices. For instance, device A 311 can be a mobile phone or other mobile devices, device B 312 can be a laptop, and device C 313 can be a personal computer.

As another example, group 320 includes device D 321 and device E 322, each of which is also associated with a device DID. Device D 321 is associated with device DID 324, and device E 322 is associated with device DID 325. The ellipsis 323 represents that there can be any number of additional devices in the group 320. User 328 can be an organization, who owns multiple devices, including device D 321 and device E 322.

Further, in some embodiments, a device is included in more than one group and be associated with more than one device DID. For example, as illustrated in FIG. 3, group 330 includes device C 313 and device D 321, each of which also belongs to another group. In particular, device C 313 belongs to both group 310 and group 330, and device C 313 is associated with both device DID 316 and device DID 331. In particular, one device DIDs (i.e., device DID 316) of device C 313 belongs to group 310, and the other device DIDs (i.e., device DID 331) of device C 313 belongs to group 330. Similarly, device D 321 belongs to both group 320 and group 330, and device D 321 is associated with both device DID 324 and device DID 332. In particular, one device DID (i.e., device DID 324) of device D belongs to group 320, and the other device DID (i.e., device DID 332) of device D belongs to group 330. In this case, the group 334 is a team of members that work together on a same project. Each of the user of device C 313 and the user of device D 321 is a team member of the user group 334.

Each device (e.g., device A 311, device B 312, device C 313, device D 321, and device E 322) in environment 300 corresponds to the DID device 201 of FIG. 2, and each device DID (e.g., device DID 314, 315, 316, 324, 325) corresponds to the DID 205 of FIG. 2.

Figure 4:
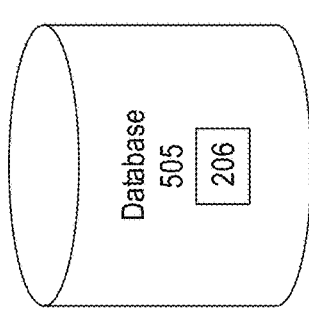
FIG. 4 illustrates an example environment, in which various DID management operations and services is performed.
Figure 4:
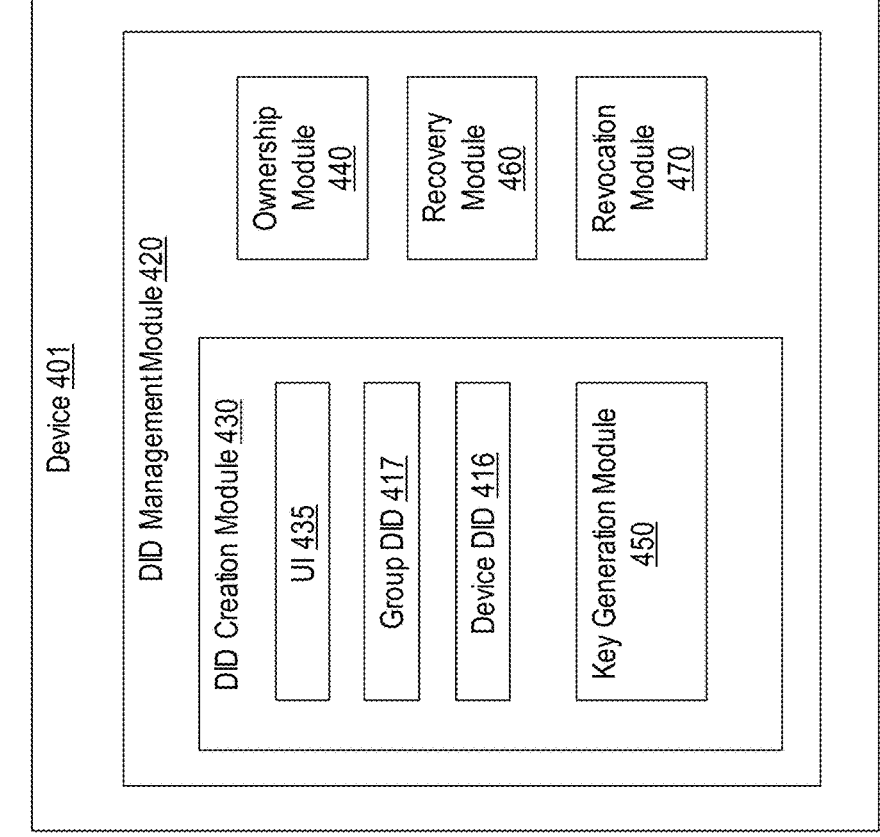

Having described device DIDs and how they are generally associated with devices with reference to FIGS. 2 and 3, specific embodiments of devices associated with device DIDs will now be explained. Turning to FIG. 4, an environment 400 that is used to perform various DID lifecycle management operations and services will now be explained. It will be appreciated that the environment of FIG. 4 references elements from FIGS. 2 and 3 as needed for ease of explanation.

As shown in FIG. 4, environment 400 includes various devices and computing systems that is owned or otherwise under the control of various users. These include device 401. The device 401 corresponds to the device 201 of FIG. 2 and/or anyone of the devices 311, 312, 313, 321, 322 of FIG. 3. The device 401 includes, but is not limited to, a mobile device such as a smartphone, a computing device such as a laptop computer, or any device such as a car or an appliance that includes computing abilities. The device 401 also includes a web browser operating on the device and an operating system operating at the device. More broadly speaking, the device 401 or any portion of the device 401 (including, but are not limited to the web browser, the operating system, and any particular application) is deemed as a DID device 201 and is associated with a DID 205.

The device 401 includes a DID lifecycle management module 420. It will be noted that in operation, the DID lifecycle management module 420 resides on and be executed by the operating system of the device 401, and/or a specific application installed at the device 401. In some embodiments, the DID lifecycle management module 420 is hosted at a remote service or cloud service. A web browser installed at the device 401 or a web application is implemented at the device 401 to allow the user to interface with the remote service. Accordingly, DID lifecycle management module 420 is shown as being separate for ease of explanation.

As shown in FIG. 4, the DID lifecycle management module 420 includes a DID creation module 430. The DID creation module 430 is used by the device 401 to create a device group DID 517 and a device DID 516 or any number of additional group DIDs or device DIDs.

For example, device 401 corresponds to device C 313 of FIG. 3. When a device group is first generated, the device that generates the device group is likely the first device to be included in the group. As an example, device C 313 is the device that generated the device group 310. To generate the device group 310, the DID lifecycle management module 420 first generates a device group DID 317, and then associate the device DID 317 with the group. After the device group 310 is generated, the DID lifecycle management module 420 then generates a device DID 416 and associate the device DID 416 with the device.

Later, the user sometimes also wants to join the device C 313 to another group (e.g., a workgroup). For example, group 330 is a workgroup including several coworkers' devices. The group 330 was created by device D 321, and a device group DID 333 has been generated by a management module of device D 321. To join the group 330, device D 321 is required to approve the join request from device C 313. Once the device D 321 approves the request from the device C 313, the device D 321 sends the device group DID 333 to the device C 313, and the DID creation module 430 of device C 313 then uses the received device group DID 333 to generate a new device DID 316. The device DID 316 is then associated with device C and used to access data or services associated with group 330.

In one embodiment, the DID creation module 430 also includes or otherwise has access to a User Interface (UI) element 435 that guides the device 401 in creating the device group DIDs 417 and/or device DIDs 416. The DID creation module 430 has one or more drivers that are configured to work with the specifically distributed ledgers such as distributed ledger 220 so that the DID 417 and/or 416 complies with the underlying methods of that distributed ledger 220.

The DID creation module 430 also includes a key generation module 450. The key generation module generates the private key 206 and public key 207 pairs previously described. The DID creation module 430 then uses the group DID 417 and/or device DID 516 and the corresponding private and public key pair to generate the DID document 480 (which, in some cases, corresponds to the DID document 210 of FIG. 2).

In operation, the DID creation module 430 accesses a registrar 410 that is configured to the specific distributed ledger that will be recording the transactions related to the DID 417 and/or DID 416. The DID creation module 430 uses the registrar 410 to record the DID hash in the distributed ledger in the manner previously described and to store the DID document 480 in the manner previously described.

In some embodiments, the DID lifecycle management module 420 includes an ownership module 440. The ownership module 440 provides mechanisms that ensure that the device 401 is aware that the device 401 is in sole control of the DID 417 and/or DID 416. In this way, the provider of the DID lifecycle management module 420 is able to ensure that the provider does not control the DID 417 and/or 416, but is only providing the management services.

As previously discussed, the key generation module 450 generates a private key and public key 408 pair for the device group DID 417. The public key of the device group DID 408 is recorded in the DID document 480. Similarly, the key generation module 450 also generates a private key and public key 409 pairs for the device DID 416. The public key of the device DID 409 is also recorded in the DID document 480.

When the device 401 desires to join a new group or create a new group, the device 401 executes the DID creation module 430 again to generate a new group DID and a new device DID that is associated with the group. The DID creation module 430 then uses the registrar 410 to update the same DID document 480 or a different DID document (not shown) to reflect that the new group DID and the new device DID are associated with the device 401, and this is also reflected in an updated transaction on the distributed ledger 220 as previously described.

In some embodiments, it is advantageous to have only one group DID and one device DID is associated with a particular device. The one group DID is used to identify a particular user's personal device, so that the user has complete control to each of his/her personal devices. In some embodiments, it is advantageous to have multiple group DIDs and multiple device DIDs generated for various purposes. For example, the user joins its devices to various groups, such as a personal device group and work device group. In a work device group, a team of coworkers can cooperate with each other. In each group, the group DID is granted a scope of permission. Once the group DID is granted the scope of permission, each device DID within the group will be granted a subset of the scope of permission.

In other embodiments, the DID lifecycle management module 420 includes a recovery module 460 that is used to recover a lost private key 206. In operation, the recovery module 460 allows the device 401 to select one or more recovery mechanisms at the time the DID 417 or 416 is created that is later used to recover the lost private key. The DID lifecycle management module 420 also includes a revocation module 470 that is used to revoke or sever a device from the group DID 417 or device DID 416.

As briefly described above, the DID lifecycle management module 420 also includes a user interface (UI) 435, and the functions of different modules is performed via interfacing with the UI 435. For example, the UI 435 allows the device 401 to provide required information that will be needed by the one or more recovery mechanisms when the recovery mechanisms are implemented. The recovery module 460 is then be run to recover any one of the DIDs generated by the DID creation module 430.

In operation, the revocation module also uses the UI element 435, which allows the device 401 to indicate a desire to remove a device from being associated with the DID 417 or 416. In one embodiment, the revocation module accesses the DID document 480 and causes that all references to the device be removed from the DID document 480. Alternatively, the public keys 408 and 409 for the device are removed. This change in the DID document 580 is then reflected as an updated transaction on the distributed ledger 220 as previously described.

Some example embodiments of the UI 435 will now be described. For example, UI 435 provides a prompt for the user to enter a username or some other human recognizable name. This name is used as a display name for the group DID 417 and/or device DID 416 that will be generated. As previously described, the group DID 417 and/or device DID 416 is a long string of random numbers and letters and so having a human recognizable name for a display name be advantageous. In some embodiments, the UI 435 is able to present the public key of each group DID or device DID as a coded image, e.g., a bar code or a QR code. In some embodiments, the UI 435 presents group DIDs 417 or device DIDs 416 in a listing of identities (e.g., device identities) and is associated with the human recognizable name (e.g., the user's first name, or a workgroup name).

Figure 5A:
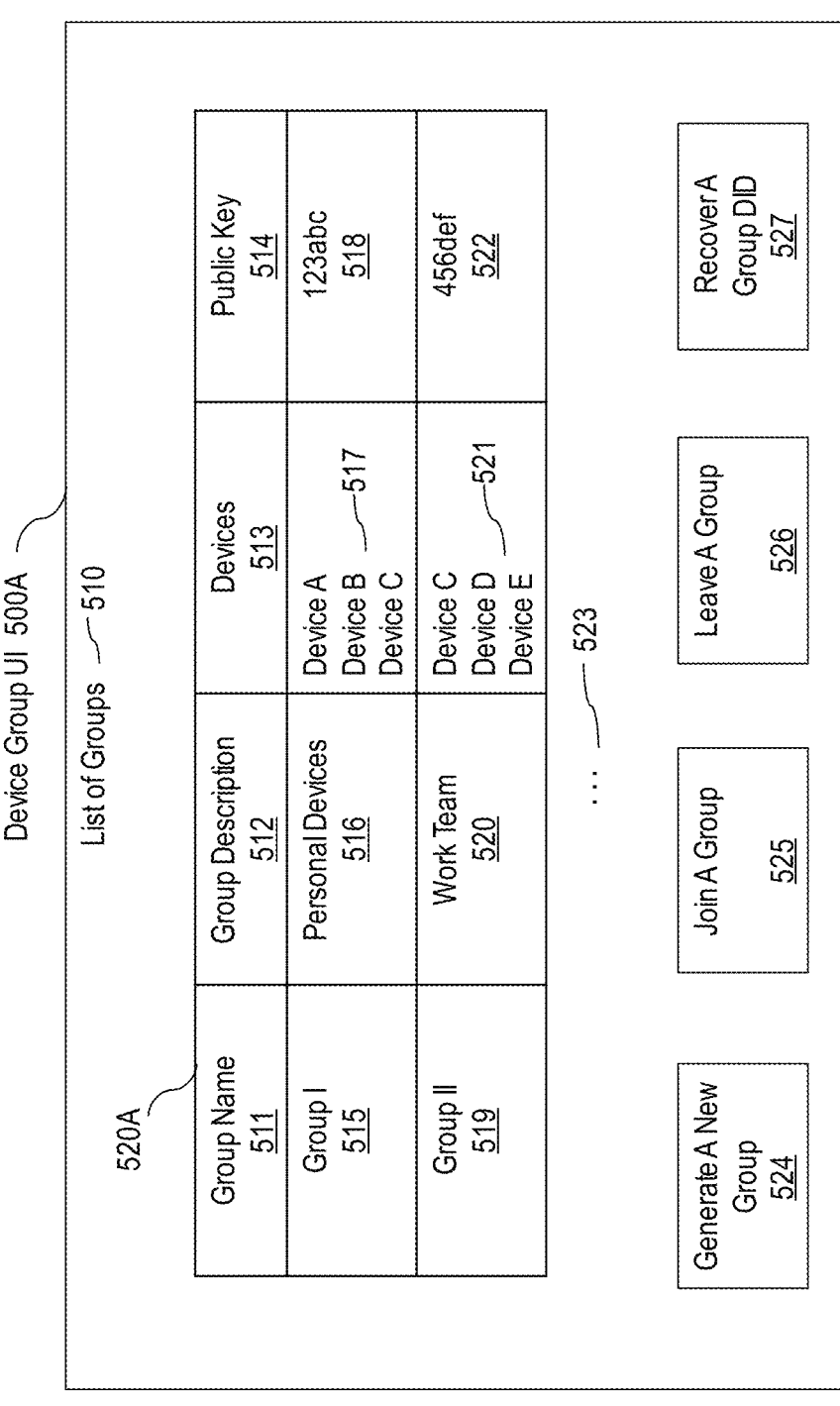

FIG. 5A illustrates an example device group listing user interface 500A that is displayed to a user. Referring to FIG. 5A, the user interface 500A includes a title bar 510 that displays the subject title of the user interface 500A. For example, the title bar 510 simply displays "List of Groups".

The workspace of the user interface 500A includes a table or a list listing all the groups the device belongs to. The device corresponds to device 401 of FIG. 4. In some embodiments, the list is as simple as only listing the name of the group names 511. In some embodiments, additional attributes and details of each group are listed. For example, a short description of the group is included as a column (e.g., group description column 512), a list of devices that belong to the group is also be included in the table (e.g., devices column 513), and public keys of each group also be included in the table (e.g., public key column 514). Complete DIDs of each group (including private keys) also be included in the table. However, since private keys are generally required to keep as a secret, it would be advantageous not to store private keys on the device, or display private keys on the user interface 500A.

FIG. 5A illustrates an example table 520A of the groups the device belongs to. For example, the device (that runs the DID lifecycle management module 420) belong to Group I 515 and Group II 519. Group I 515 include multiple personal devices (e.g., device A, device B and device C 517) owned by the user, and the public key of Group I is 123abc 518. Group II 519 is a work team 520 that the user is part of. The work team 520 includes device C, device D, and device E 521, and the public key of group II is 456def 522. Ellipsis 523 represents that there is any number of groups the user belongs to. In some cases, a device only belongs to one group (e.g. a personal device group 516). In some cases, a device belongs to many different groups, depending on the purpose of the device.

At the bottom of the device group UI 500A, there are one or more buttons or links that the user can click to initiate additional functions that are provided by the DID lifecycle management module 420. For example, the "generate a new group" button 524 allow a user to generate a new group. When a user clicks button 524, a popup window (not shown) is generated for the user, or some other UI element is generated to prompt the user to enter the new group name, and group descriptions. In some embodiments, when the group is first generated, by default only the device that generates the group is included in the group. In some embodiments, the popup window further asks the user to input the devices that are to be added to the group. The user inputs a physical identifier of each device (e.g., the MAC address) to add the device into the group. Thereafter, the key generation module 450 automatically generates a public and private key pair for the newly generated group.

Further, the user also clicks the "join a group" button 525 to join an existing group. When the user clicks button 525, another popup window is generated for the user to enter the existing group's information. For example, the user enters the public key of the group, the group name, or a physical identifier of a device (e.g., the MAC address of the device) that already belongs to the group.

Additionally, the "leave a group" button 526 allows the device to leave a group. When the user clicks the button 526, a popup window is generated for the user to select one or more groups that the user wants to leave. After the user confirms the operation of leaving a group, the revocation module 470 updates the DID document 480 to remove the corresponding device public key 408 and the device group public key 409. A revocation transaction is also recorded to the distributed ledger 220 or registrar 410.

Finally, the "recover a group DID" button 527 allows a user to recover a group DID 527. In some embodiments, the group DID is needed by another device which is about to join the group, or for some other purposes. When the user clicks button 527, the user is prompted to select a group whose DID is to be recovered.

In some embodiments, each group name 515, 519 also be a clickable link. When a user clicks a particular group name 515 or 519, a device group user interface is displayed. The device group user interface includes additional details about the particular group.

FIG. 5B illustrates an example device group user interface 500B, which displays a particular group's information. As illustrated in FIG. 5B, the device group UI 500B includes a title bar that displays the group name 530. The workspace of the user interface 500B displays a table or list 530A of devices that are included in the group. In some embodiments, the workspace is as simple as a list of the device names 531. In some embodiments, additional information is displayed. For example, a short description of each device is displayed on table 530A (e.g., device description column 532). Each device's physical identifier 533 also be displayed on the table. The device's physical identifier includes (but is not limited to) a mac address 537 or a serial number 541. Each device's public key 534 also be displayed.

For example, as illustrated in FIG. 5B, the selected group includes device A 535 and device B 539. The ellipsis 543 represents that there is any number of additional devices in group 530. Device A is a mobile phone 536, and device B is a laptop 540. Device A's mac address 537 is listed as the hardware identifier, and device B's serial number 541 is listed as the hardware identifier. Further, device A's public key is 789ghi, and device B's public key is abc321, which is also listed on the table.

Furthermore, additional information is included and recorded in the table 530A. For example, certain activities of each device is also recorded and displayed. When the group is a personal device group, a same user is using each of the devices contained in the group. In such a case, it would be advantageous for the user to see each device's activities. If there are any abnormal activities, the user can see it, or the system allows automatic removal or suspension of the device with abnormal activities from the group.

At the bottom of the user interface 500B, there are also a number of buttons or clickable links that allow the user to perform various functions provided by the DID management module 430. For example, the "add a device" button 544 allows a user to add a device to the group. When the user clicks button 544, the user is prompted to enter the new device's information (e.g., a physical identifier). Once the user confirms adding the new device to the group, the new device receives an invite to join the group.

The "remove a device" button 545 allows the user to remove a device. For example, when a user clicks button 545, the user is prompted to select one or more of the devices on the list that are to be removed. Once the user confirms that the device is removed, the revocation module 470 performs certain operations including removing the corresponding device public key from the DID document 480, and/or recording the removal transaction at the distributed ledger 220 or the registrar 410. Further, in some cases, the removed device also receives a notification that it has been removed from the group. The management module installed at the removed device also performs a removal operation to remove not only the information related to the device DID, but also the information related to the group DID. The removal operation is very useful when a device is lost or otherwise compromised in some other way.

Furthermore, in some cases, one device within a group also is allowed to recover a device DID of another device. The "recover a device DID" button 546 allows the device to select another device in the group and to recover the other device's DID if needed.

In some embodiments, for additional security, more than one device is required to complete certain operations. For example, when a new device is to be added to a group, the user set the requirement to require confirmations from two different existing devices within the group, or any number of devices within the group. One device initiates the adding of the new device to the group. Once the adding operation is initiated, each one of the other devices within the group or another particular device receives a notification. At least one other device that has received the notification must confirm and approve the adding operation to finally add the new device to the group.

The user interfaces 500A and 500B are merely examples of UIs 435 that is implemented at the DID lifecycle management module 420. Additional user interface elements or layout of the user interface is implemented to perform the same or additional functions.

Referring back to FIG. 4, the DID lifecycle management module 420 includes a DID creation module 430. Example embodiments of DID creation module 430 will be further discussed below with respect to FIGS. 6-8. Theoretically, each group or device DID can be randomly generated, and two device DIDs do not have to have any relationship with each other. However, since the devices within a group are often owned by the same user or used by a same group of users, it would be advantageous to systematically generate and manage DIDs across all the related devices within the same group. As such, a DID that is generated by one device is recovered by another device.

Figure 6:
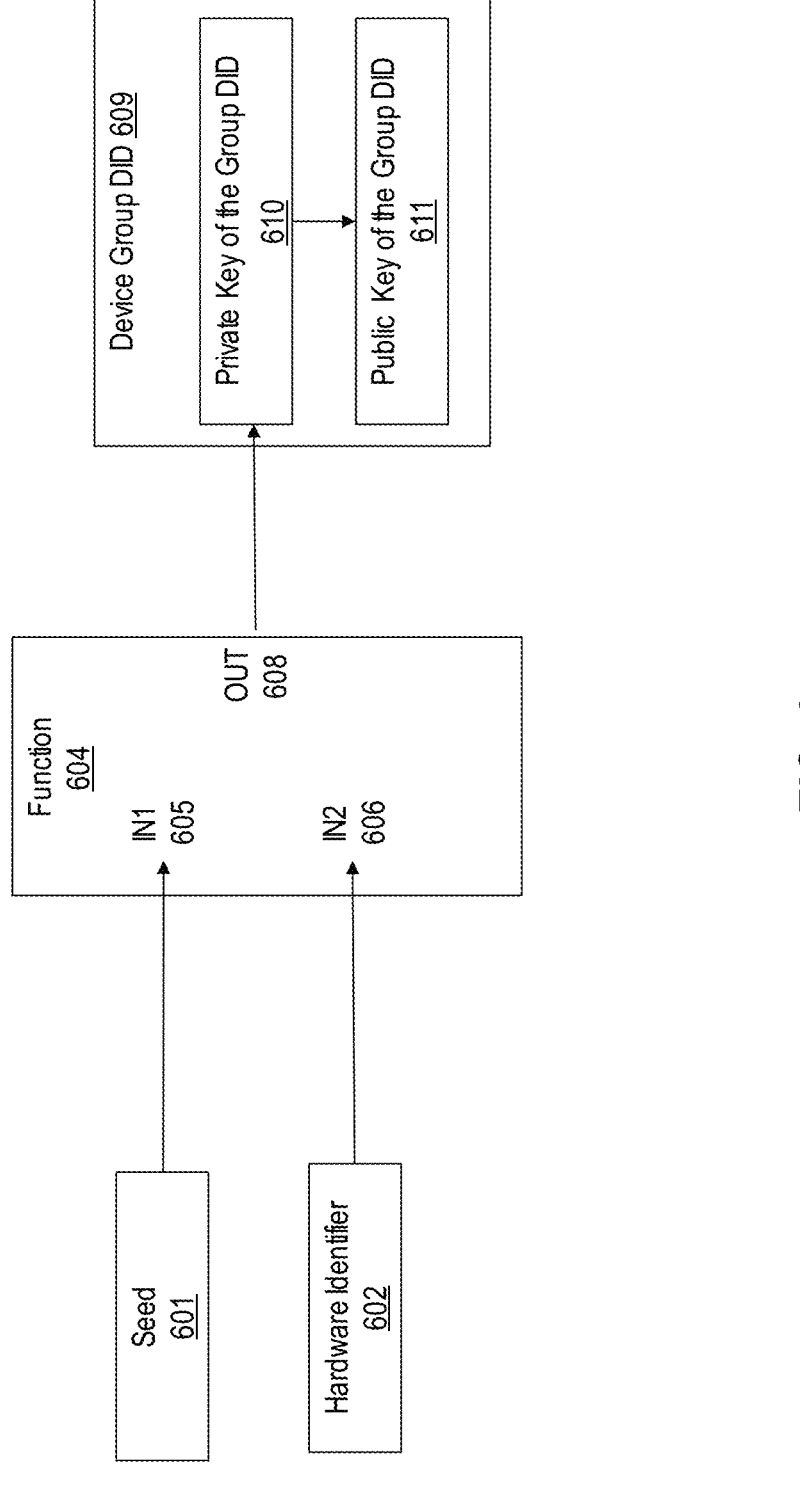
FIG. 6 illustrates an example embodiment for generating a device group DID using a seed and a hardware identifier.

FIG. 6 illustrates an example embodiment 600 for generating device group DIDs. The embodiment 600 corresponds to the DID generation module 430 of FIG. 4. As illustrated in FIG. 6, a seed 601 and a hardware identifier 602 is used as two inputs 605, 606 into a function 604 to generate an output 608. The output 608 then be used as a private key of the device group DID 610. The private key of the device group DID 610 then be used to generate a public key of the device group DID 611. The private key of the group DID 610 and the public key of the group DID 611 then be used as a key pair of the device group DID 609.

The function 604 is any deterministic function that can generate a different result when different inputs are received, or only in very rare cases, different inputs result in a same result. When the possibility of generating the same result from different inputs is very small, such possibility is ignored, because it is almost impossible for someone to regenerate the device group DID 609 without the correct two inputs 605, 606. Also, it is desirable that the function 604 is a one-way function, such that it is computationally difficult for one to reverse the two inputs using the result. For example, function 604 is a hash function that is configured to generate a fixed size code.

The hardware identifier 602 is any constant value that is associated with a hardware device. The constant value is a combination of more than one constant values. For example, the device 501 have a serial number assigned by its manufacturer, which is used as the hardware identifier 602. Alternatively, the hardware identifier 602 is an identifier of the hardware at the service provider (e.g., identity hub 911), which the group of devices has access to. Alternatively, or in addition, the hardware identifier 602 is a combination of an identifier of the service provider (e.g., the service provider's name, a numerical identifier, etc.) and an identifier of the device 501. As another example, the hardware identifier 602 is a combination of an identifier of the identity hub 911 (which the group of devices has access to) and an identifier of the device 501. The constant value of the hardware identifier 602 is (but are not limited to) a BOIS serial number, a motherboard serial number, a MAC address of a network adapter, and a Machine Security Identifier (SID) of the device 501 and/or the service provider.

In some embodiments, additional value(s) is entered as inputs of the function 604. For example, in some embodiments, a group index number is used as one of the inputs of the function 604. When a new group DID is generated, the index number is increased by one, so that even though the same function 604 is used to generate each group DID, a different group DID is generated because a different group index is used as one of the inputs.

The seed 601 is input by a user, like a passphrase. Alternatively, the seed 601 is a code generated based on the passphrase that is entered by the user. Further details of an example embodiment for generating the seed 601 will be described below with respect to FIG. 7.

Figure 7:
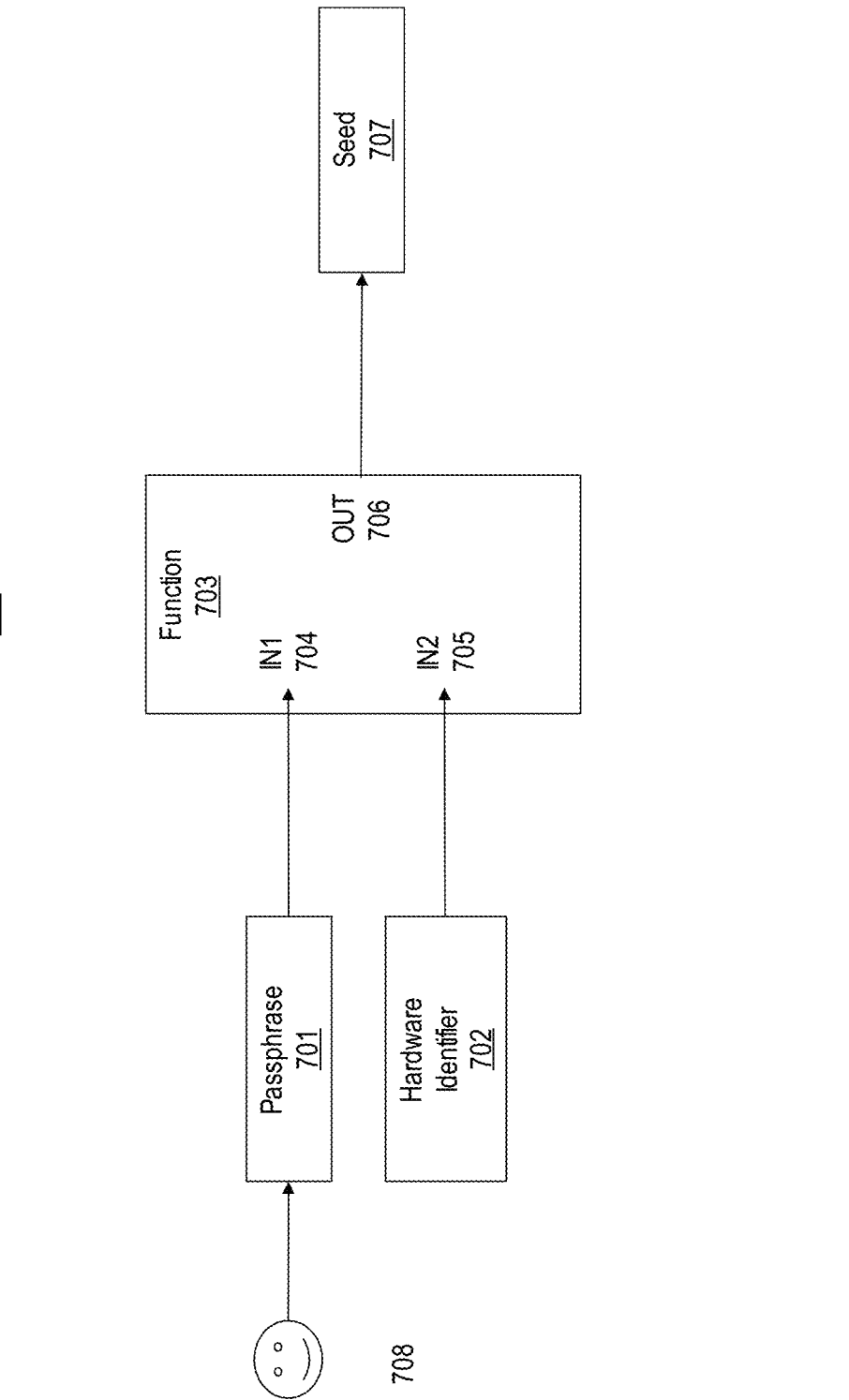
FIG. 7 illustrates an example embodiment for generating a seed that is used to generate the device group DID of FIG. 6.

FIG. 7 illustrates an example embodiment 700 for generating a seed 707, which correspond to the seed 601 in FIG. 6. Referring to FIG. 7, a passphrase 701 and a hardware identifier 702 are used as two inputs of the function 703 to generate an output 706. The output 706 then be used as the seed 707. The passphrase 701 is an input from the user. In some embodiments, the hardware identifier 702 here is the same hardware identifier 602. Alternatively, the hardware identifier 702 is generated using a different regime or a different constant value related to the same hardware piece or different hardware piece; thus, they are not necessarily the same value. For example, the hardware identifier 702 use the BOIS serial number of the device 501, and the hardware identifier 602 use the motherboard serial number of the device 501.

The function 703 is any deterministic function that can generate a different result when different inputs 704 and 705 are received, and generate a same result when the same inputs 704 and 705 are entered. Alternatively, it is that only in very rare cases different inputs 704 and 705 result in a same result. As long as the chance of generating the same results using different inputs is very rare, such potential risk is often ignored. Also, it is desirable that the function 703 is a one-way function, such that it is computationally difficult for one to reverse the two inputs 701 and 702 using the output 706. For example, function 703 is a hash function that is configured to generate a fixed size code. The generated fixed-size code then be used as the seed 707.

The seed 707 then be used as one of the inputs in function 604 of FIG. 6 to generate the group DID 609. Accordingly, even though the group DID 609 is long and complex (e.g., 4096 bits), a user or the device associated with the DID does not have to remember or record it. Instead, the user or the device only needs to remember the passphrase that he/she originally entered. Each time, when the passphrase is received, the system will be able to regenerate the seed 707, 601. Based on the regenerated seed 707, 601 and the retrieved hardware identifier(s) 602, 702, the device 501 can regenerate the device group DID 609 at any time.

Different embodiments can be implemented for generating device DIDs. A device DID is generated using a similar implementation as illustrated in FIGS. 6 and 7. For example, a user is prompt a different passphrase to generate a device DID. Alternatively, or in addition, a device DID indicator is used as an additional input in functions 604 and/or 703 to generate a device DID.

Figure 8:
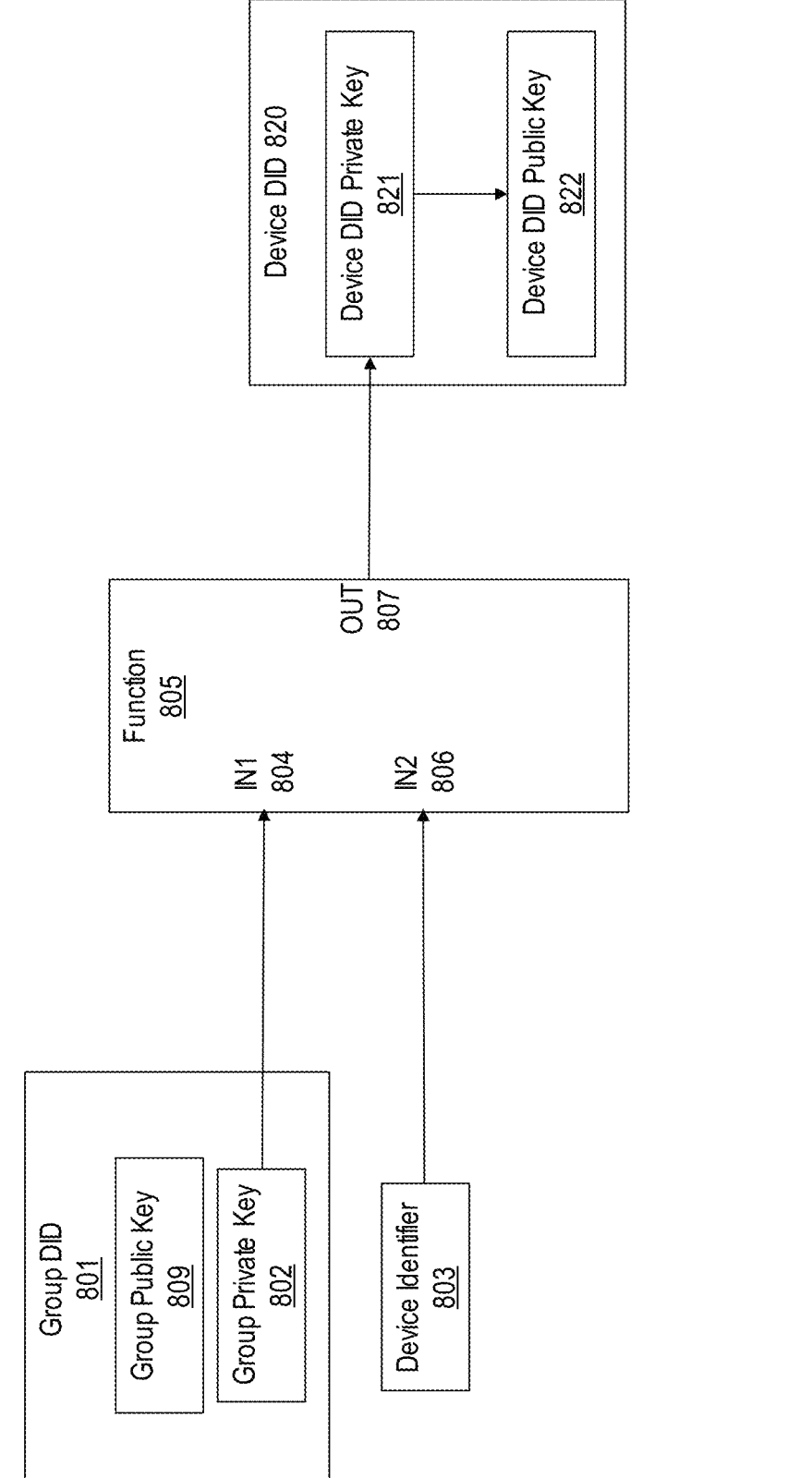
FIG. 8 illustrates an example embodiment for generating a device DID for each device.

FIG. 8 illustrates an example embodiment 800 for generating a device DID 809. As illustrated in FIG. 8, a seed 801, a hardware identifier 802, and a device DID indicator 803 is used as three inputs 805, 806, 807 into a function 804. The output 808 then be used as a private key of the device DID 810. The private key of the device DID 810 then be used to generate a public key of the device DID 811. The private key of the device DID 810 and the public key of the device DID 810 then be used as a key pair of the device DID 809. The function 804 is any deterministic function that can generate a different result when different inputs are received, or only in very rare cases, different inputs result in a same result. When the possibility of generating the same result from different inputs is very small, such possibility is ignored, because it is almost impossible for someone to regenerate the device DID 809 without the correct three inputs 805, 806, 807. Also, it is desirable that the function 804 is a one-way function, such that it is computationally difficult for one to reverse the two inputs using the result. For example, function 804 is a hash function that is configured to generate a fixed size code.

The hardware identifier 802, similar to the hardware identifier 602, is any constant value that is associated with a hardware device. The seed 801, similar to the seed 601, is generated via any deterministic one-way function 703. The device DID indicator 803 is any value that indicates that the DID is a device DID, instead of a group DID or any other types of DIDs. For example, a particular natural number is used to indicate that the generated DID is a device DID. As an example, "1" is used as a device DID indicator to indicate that the generated DID is a device DID; and "0" is used as a device group DID indicator to indicate that the generated DID is a group DID.

It is advantageous to include the hardware identifier 802 as part of the input to generate a device DID, because it is easily verifiable whether the device DID matches the corresponding device when being used. For example, if another user obtains a device DID and tries to use the device DID to access data via another device, the system is able to detect that the other device is not part of the group, because the device DID cannot be regenerated using the different device's identifier.

In some embodiments, additional inputs are added to the function 805 as input. For example, an index number is added as an additional input of the function 805. Each time, a new device is added into the group, an index is increased by one. In some embodiments, the hardware identifier 803 is replaced by another input. For example, an index number is used to replace the hardware identifier as an input of the function 805.

Accordingly, FIGS. 6 through 8 provide example embodiments for generating DIDs using various deterministic functions. As long as the user remembers his/her passphrase, the device group DID and/or each device DID is recovered by any device management module 420 installed at any device contained in the group. Additionally, since the device DIDs are generated using a constant value associated with the device, it is verifiable whether the device trying to access certain data is truly associated with the device DID presented to the ID hub 911.

Furthermore, as briefly described above, various services are provided by utilizing the device DIDs in a decentralized environment, such as environment 300. For example, the group device DID is granted a scope of permission to access a personal storage at an ID hub. Once the group device DID is granted the scope of permission, each device DID within the group then be granted a subset of the scope of the permission. The permission includes a permission to perform at least one of the following: (1) reading a set of data stored at the storage, (2) writing a set of data into the storage, (3) copying a set of data stored at the storage, and (4) deleting a set of data stored at the storage.

Figure 9:
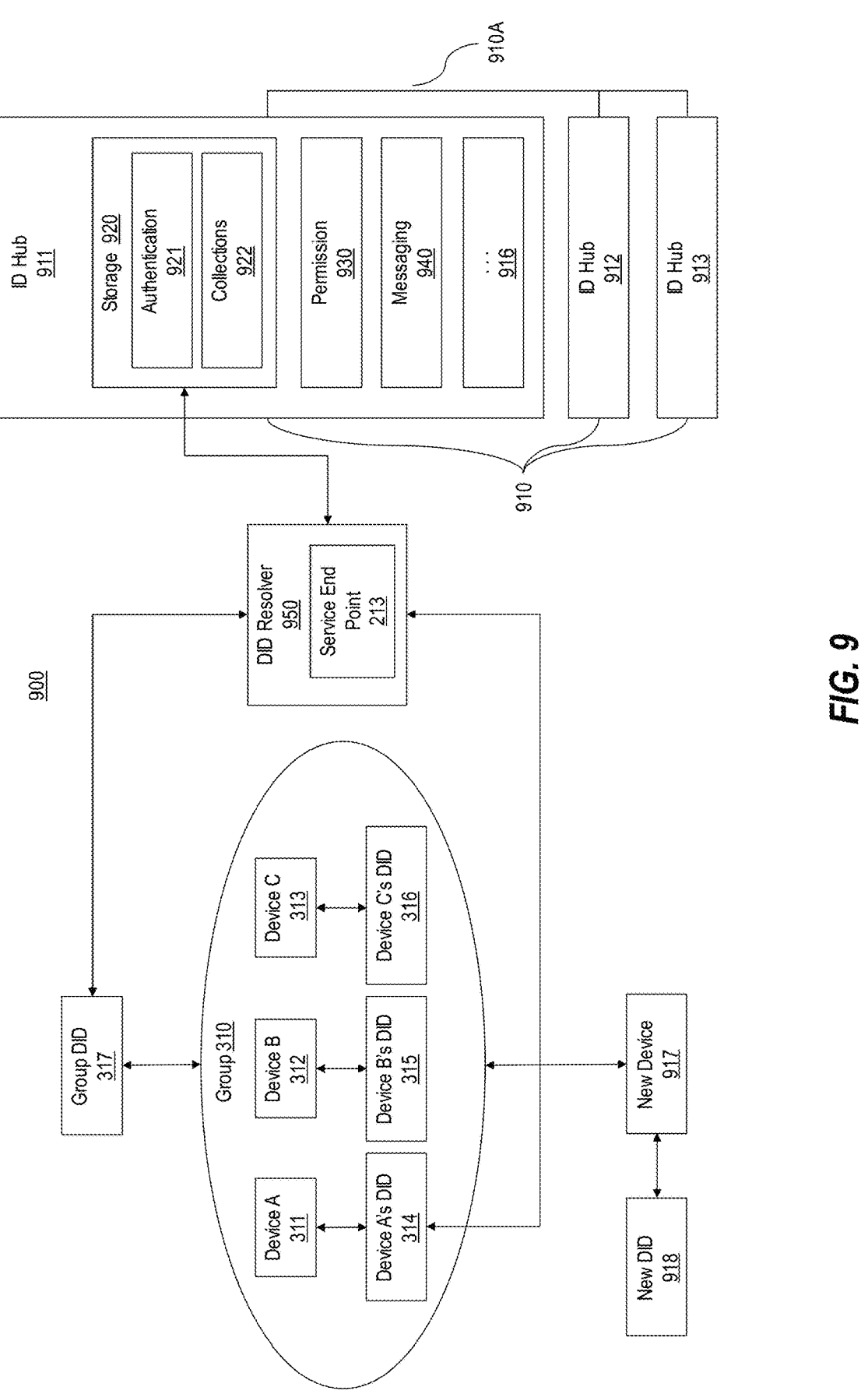
FIG. 9 illustrates an example environment in which a device group DID and device DIDs is utilized.

FIG. 9 illustrates an example environment 900 in which a device group DID and device DIDs are utilized. Specifically, the environment 900 will be used to describe the use of the device group DID 317 and device DIDs 314-316 in relation to one or more decentralized personal storages or identity hubs. It will be noted that FIG. 9 includes references to elements first discussed in relation to FIG. 2 or 3 and thus use the same reference numeral for ease of explanation.

In one embodiment, the identity hubs 910 is multiple instances of the same identity hub. This is represented by line 910A. Thus, the various identity hubs 910 include at least some of the same data and services. Accordingly, if any change is made to one of the identity hubs 910, the change is reflected in the remaining identity hubs. For example, the first identity hub 911 and second identity hub 912 are implemented in cloud storage and thus is able to hold a large amount of data. Accordingly, a full set of data is stored in these identity hubs. However, in some cases, the identity hub 913 has less memory space. Accordingly, in this identity hub, a descriptor of the data stored in the first and second identity hubs is included. Alternatively, a record of changes made to the data in other identity hubs is included. Thus, changes in one of the identity hubs 910 are either fully replicated in the other identity hubs or at least a record or descriptor of that data is recorded in the other identity hubs.

Because the identity hubs are multiple instances of the same identity hub, only a full description of the first identity hub 911 will be provided as this description also applies to the identity hubs 912-913. As illustrated, identity hub 911 includes data storage 920. The data storage 920 is used to store any type of data that is associated with the device group DID 317.

In one embodiment the data is a collection 922 of a specific type of data corresponding to a specific protocol. For example, collection 922 is medical records data that corresponds to a specific protocol for medical data. Collection 922 is any other type of data.

In one embodiment, the stored data have different authentication and privacy settings 921 associated with the stored data. For example, a first subset of the data has a setting 921 that allows the data to be publicly exposed, but that does not include any authentication to device group DID 317. This type of data is for relatively unimportant data such as color schemes and the like. A second subset of the data has a setting 921 that allows the data to be publicly exposed and that includes authentication to device group DID 317.

A third subset of the data has a setting 921 that encrypts the subset of data with the private key 206 and public key 207 pair (or some other key pair) associated with device group DID 317. This type of data will require a device to have the private key 207 or to some other associated private key in order to decrypt the data. In some embodiments, this process also includes authentication to device group DID 317.

Since group DID 317 is associated with a group 310 of devices including device A 311, device B 312, and device C 313, each corresponding DID 314, 315, or 316 associated with device A 311, device B 312, or device C 313 is granted access to a subset of the scope of permission as that of the group DID 317 to access the data storage 920. In some embodiments, the identity hub 911 has a permission module 930 that allows the device group DID 317 to set specific authorization or permissions for other devices to access the identity hub. For example, device group DID 317 provide access permission to all devices contained in group 310 to access all the data 920.

In some embodiments, the identity hub 911 also has a messaging module 940. In operation, the messaging module allows the identity hub 911 to receive messages such as requests from other devices such as device A 311, device B 312 and device C 313 to access the data and services of the identity hub 911. In addition, the messaging module 940 allows the identity hub 911 to respond to the messages from the devices and to also communicate with a DID resolver 950. This will be explained in more detail to follow. The ellipses 916 represents that the identity hub 911 has any number of additional services as circumstances warrant.

In one embodiment, device A 311 wish to add a new device 917 into group 310. As described with respect to FIG. 4, a user interacts with the DID lifecycle management module 420 installed at device A 311 to initiate to add the new device 917 to the group 310. After the device A 311 initiates the adding operation, the DID management module installed at the new device 917 receives a notification and generates a new DID 918. The new DID 918 is then associated with the new device 917 and added into the group 310. Once the new device 917 is included in group 310, the new DID 918 is granted the same permission of the group DID 317. When the new device 917 associated with the new DID 918 is added into the group 310 and granted the scope of permission to access the data storage 920, the transaction of adding the new device 917 associated with a new DID 918 is recorded at the distributed ledger 220.

However, the identity hub 911 not initially recognize the new device 917 as being associated with the group 310. Accordingly, the identity hub 911 uses the messaging module 940 to contact the DID resolver 950. The message sent to the DID resolver 950 includes the DID 918 associated with the new device 917.

The DID resolver 950 is a service, application, or module that is configured in operation to search the distributed ledger 220 for DID documents associated with DIDs. In this case, the DID resolver 950 search the distributed ledger 220 using the new device DID 918, which result in the DID resolver 950 finding the DID document corresponding to the new DID 918. The DID document corresponds to the DID document 210 of FIG. 2. The DID document then is provided to the identity hub 911.

As discussed previously, the DID document 210 includes a public key that is associated with the corresponding DID. To verify that the group authorizes the new device DID 317, the identity hub 911 provides a cryptographic challenge to the new device using the messaging module 940. This cryptographic challenge is structured such that only a device having access to a key (e.g., a private key or a public key) will be able to successfully answer the challenge.

It will be noted that this process of authenticating the new device is performed without the need for the user of the new device to provide any username, password or the like to the provider of the identity hub 911 (i.e., a cloud storage provider) before the identity hub 911 could be accessed. Rather, the access was determined in a decentralized manner based on the DID 918, the DID document, and the associated public and private keys. Since these were at all times in the control of new device 918, the provider of the identity hub 911 was not involved and thus has no knowledge of the transaction or of any personal information of the user of the device 918.

Once the new device is included in the group 310, the new device accesses the DID resolver 950 to access the DID document 210. As previously discussed, the DID document 210 includes an endpoint 213 that is an address or pointer to the identity hub 911. The new device 918 then uses the address or pointer to access the identity hub 911.

Advantageously, the above-described process allows the identity hub 911 and the multiple devices to communicate and to share the data without the need for the users to access the identity hub 911 in a conventional manner. Rather, the communication is provisioned in a decentralized manner using the DIDs 314, 315, 316, and 918 and the DID documents. This advantageously allows the users to be in full control of the process, and in full control of each individual device, while protecting each user's personally identifiable information.

Further, the principles described herein also differentiate from some existing embodiments of ID hubs, which grants the scope of permissions to DIDs associated with particular users. Each user then uses the same DID on multiple devices to access the data. Additionally, such existing ID hubs allow one user's DID to grant a scope or a sub-scope of permission to a second user's DID. A second user's DID then grants a scope or a sub-scope of permission to a third user's DID. In such existing ID hubs, when one of the user's devices is misplaced or stolen, the DID need to be revoked. Once a DID is revoked, all the user's devices lose control of the data associated with the DID. Unlike such existing embodiments, the principles described herein provide a DID for each device. If one device is lost, there is no need to revoke the scopes of permission granted to the group of devices owned by the user, because the scopes of permissions are granted device by device, instead of user by user.

The following discussion now refers to a number of methods and method acts that is performed. Although the method acts is disused in a certain order or illustrated in a flow chart as occurring in a particular order, no particular ordering is required unless specifically stated, or required because an act is dependent on another act being completed prior to the act being performed.

Figure 10:
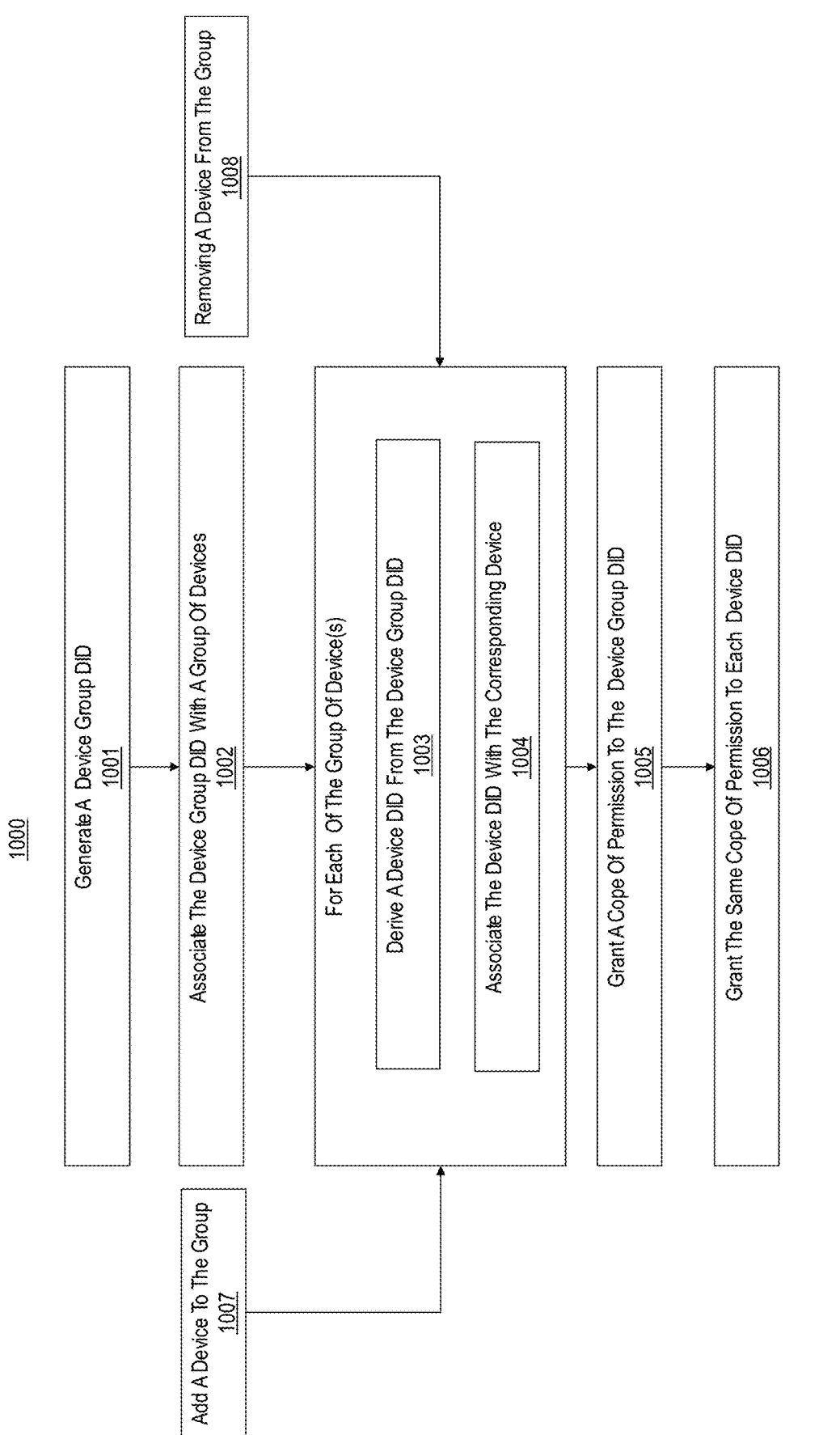
FIG. 10 illustrates a flowchart of an example method for generating and associating a DID to a group of related devices.

FIG. 10 illustrates a flowchart of an example method 1000 for generating and associating a DID to a group of related devices. In some embodiments, the method 1000 is implemented at a management module of a device. In other embodiments, the method is implemented at a remote server that the device has access to. In further embodiments, the method is implemented at an ID hub. The method 1000 includes generating a device group DID (act 1001). The device group DID is then associated with a group of devices (act 1002). FIGS. 6 and 7 illustrate an example embodiment for generating a device group DID.

For each of the group of devices, a device DID is generated (act 1003). After a device DID is generated, the device DID is then associated with the corresponding device (act 1004). FIG. 8 illustrates an example embodiment for generating a device DID for each of the devices in the group. Any other embodiments or algorithms is implemented to generate device DIDs, as long as the generated device DID is generally unique.

The method 1000 further includes granting a scope of permission to the device group DID (act 1005). In response to granting the scope of permission to the device group DID, a subset of the scope of permission is granted to each device DID that is associated with a corresponding device within the group (act 1006). The example embodiments of granting scope of permissions to device group DIDs and device DIDs are described above with respect to FIG. 9.

In some embodiments, the method 1000 also include adding a device to the group (act 1007). In some embodiments, the method 1000 also include removing a device from the group (act 1008). Example embodiments of adding and revoking devices from the group are described with respect to FIGS. 4, 5A and 5B.

Figure 11:
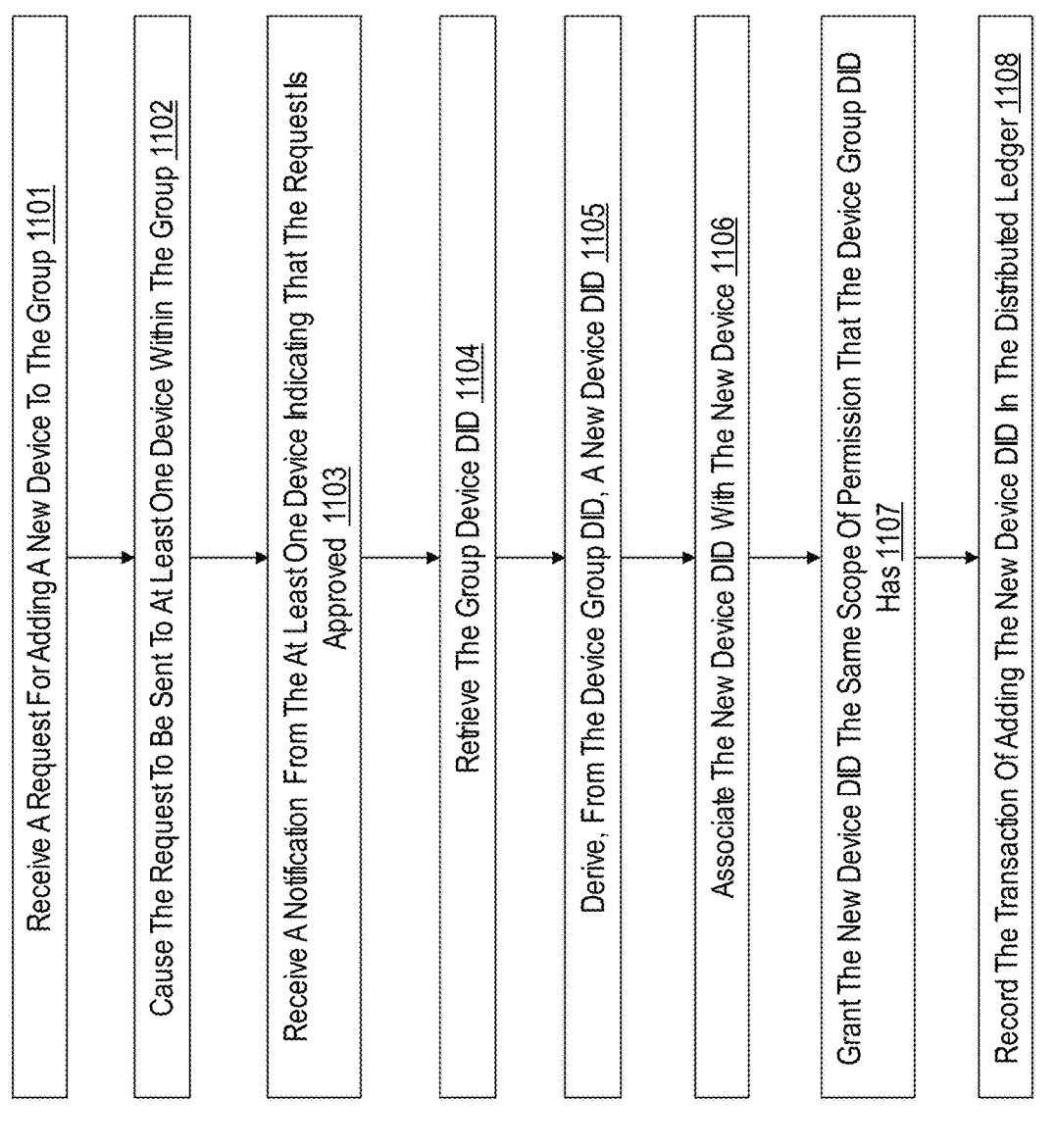
FIG. 11 illustrates a flowchart of example method 1100 for adding a device to a group.

FIG. 11 illustrates a flowchart of example method 1100 for adding a device to the group, which correspond to act 1007 of FIG. 10. In some embodiments, the method 1100 is implemented at the DID lifecycle management module 420 installed at each device within the group. In other embodiments, the method 1100 is implemented at the DID lifecycle management module 420 installed at a new device that is requested to be added. In further embodiments, the method 1100 is implemented at a remote service that is accessible by each device within the group. In still other embodiments, the method 1100 is implemented at a service provider's platform (e.g., an ID hub), which is accessible by each device within the group.

The method 1100 includes receiving a request for adding a new device to the group (act 1101). The request is then sent to at least one device within the group (act 1102). For example, a cloud service provider or the ID hub receive the request, and pass on the request to each of the devices within the group. Alternatively, a user on one of the devices within the group initiate the request, and the request is then passed on from one of the devices within the group to each other devices within the group. Alternatively, the user uses the new device to initiate the request, and the new device sends the request notification to at least another device within the group.

The at least one device within the group approve the request. Once the at least one device approves the request, the one device sends a notification to the requesting device. Accordingly, the requesting device receives the notification from the at least one device indicating that the request is approved (act 1103).

Next, a new device DID is generated (1105). Various embodiments are implemented to generate a new device DID. Example embodiments of deriving a new device DID are discussed above with respect to FIG. 8.

Finally, the new device DID is then associated with the new device (1106) and granted a subset of the scope of permission that the device group DID has (at 1107). In some embodiments, the transaction of adding the new device DID is also recorded in the distributed ledger (act 1108), so that when the new device tries to access the group data stored at the ID hub 911, the resolver 950 can retrieve and verify the new device DID recorded at the distributed ledger.

FIG. 12 illustrates a flowchart of an example method 1200 for removing a device DID from the group, which correspond to the act 1008 of FIG. 10. Similar to method 1100, in some embodiments, the method 1200 is implemented at the DID lifecycle management module 420 installed at each device within the group. In other embodiments, the method 1200 is implemented at a remote service that is accessible by each device within the group. In further embodiments, the method 1200 is implemented at a service provider's platform (e.g., an ID hub), which is accessible by each device within the group.

The method 1200 includes receiving a request for removing an existing device from the group (act 1201). The request is initiated by the to-be-removed device itself, or is initiated by another device within the group. Once the request is initiated, the request is sent to at least one other device within the group (act 1202). For example, when the device itself initiates the request, another device in the group is notified. When a device within the group requests to remove another device within the group, the to-be-removed device is notified.

Once the at least one other device within the group receives the request, the at least one other device approve the request. Once the request is approved, the requesting device receives a notification from the approving device indicating that the request is approved (act 1203). In response to the receiving of the approval, the scope of permission previously granted to the device DID that is associated with the to-be-removed device is revoked (act 1204). The device DID that is associated with the to-be-removed device is also removed from the group (act 1205). For example, the DID document is updated to remove the device DID that is associated with the removed device. In some embodiments, the removal transaction is also recorded in the distributed ledger (act 1207), so that when the removed device tries to access the group data stored at ID hub 911 again, the DID resolver 950 will retrieve the removal transaction from the distributed ledger and prevent the access of the group data by the removed device.

For the processes and methods disclosed herein, the operations performed in the processes and methods is implemented in differing order. Furthermore, the outlined operations are only provided as examples, and some of the operations are optional, combined into fewer steps and operations, supplemented with further operations, or expanded into additional operations without detracting from the essence of the disclosed embodiments.

The present invention is embodied in other specific forms without departing from its spirit or characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method implemented in a computer system that includes a processor, for generating and associating a decentralized identifier (DID) for a group of one or more related devices, the method comprising:

generating a device group DID for a group of devices by generating a private key of the device group DID based on a seed and a first hardware identifier of at least one device in the group of devices;

associating the device group DID with the group of devices;

for at least one corresponding device in the group of devices, deriving a device DID by generating a private key of the device DID based on a seed, a second hardware identifier of the corresponding device, and the device group DID; and associating the device DID with the corresponding device;

granting a scope of permission to the device group DID, including granting a first permission to add new devices into the group of devices;

in response to granting the scope of permission to the device group DID, granting the device DID a subset of the scope of permission, including granting the device DID the first permission to add new devices into the group of devices, as such the device group DID and the device DID is only linked to the device group DID or a corresponding device, and no personally identifiable information is directly associated with the device group DID or the device DID;

receiving a request for adding a new device to the group of devices;

verifying the new device with an existing device within the group of devices having the first permission; and adding the new device into the group of devices, including:

deriving a new device DID;

associating the new device DID with the new device;

granting the new device DID the subset of the scope of permission; and recording a first transaction associated with granting the new device DID the subset of the scope of permission in a distributed ledger.

2. The method of claim 1, wherein:

the scope of permission granted to the device group DID also includes a second permission to remove existing devices from the group of devices, and at least one of the device DID is granted the second permission to remove existing devices from the group of devices.

3. The method of claim 1, wherein verifying the new device with at least one permissioned existing device within the group of devices comprises:

causing the request to be sent to at least one device within the group of devices; and receiving a notification from the at least one device indicating that the request is approved.

4. The method of claim 1, wherein method further comprises:

receiving an indication to remove a particular device amongst the group of devices;

verifying removal of the particular device with an existing device that is not the particular device within the group of devices, the existing device having the first permission; and based on verifying removal of the particular device, removing the particular device from the group of devices, removing the particular device comprising:

revoking the scope of permission that has been granted to the device DID that is associated with the particular device; and deactivating the device DID that is associated with the particular device.

5. The method of claim 4, wherein verifying removal of the particular device comprises:

causing the request to be sent to at least one permissioned existing device; and receiving a notification from the at least one permissioned existing device that the request is approved.

6. The method of claim 4, wherein the method further comprises:

recording, in the distributed ledger, a second transaction associated with revoking the scope of permission that has been granted to the device DID.

7. The method of claim 1, wherein the scope of permission includes a second permission to access a storage at an ID hub.

8. The method of claim 7, wherein the permission includes a permission to perform at least one of (1) reading a set of data stored at the storage, (2) writing a set of data into the storage, (3) copying a set of data stored at the storage, and (4) deleting a set of data stored at the storage.

9. The method of claim 7, wherein when a particular device within the group of devices requests to access a set of data stored at the ID hub, the device DID corresponding to the particular device and the device group DID corresponding to the group of devices are both verified.

10. The method of claim 1, wherein generating the device group DID or a device DID comprises:

receiving a passphrase from a user;

obtaining a constant value associated with the computing system; and using the passphrase and the constant value as inputs of a hash function to generate the device group DID.

11. The method of claim 10, wherein the constant value includes one of a BIOS serial number of the device, a motherboard serial number of the device, a MAC address of a network adapter of the device, a Machine Security Identifier (SID) of the device.

12. A computer system, comprising:

a processor; and a computer-readable medium having thereon computer-executable instructions that are executable by the processor to at least:

generate a device group decentralized identity (DID) for a group of devices by generating a private key of the device group DID based on a seed and a first hardware identifier of at least one device in the group of devices;

associate the device group DID with the group of devices;

for at least one corresponding device in the group of devices, derive, from the device group DID, a first device DID by generating a private key of the first device DID based on a seed, a second hardware identifier of the corresponding device, and the device group DID; and associate the first device DID with the corresponding device;

grant a scope of permission to the device group DID, including granting a first permission to remove existing devices from the group of devices;

in response to granting the scope of permission to the first device group DID, grant the first device DID a subset of the scope of permission, including granting the first device DID the first permission to remove existing devices from the group of devices;

receive an indication to remove a particular device amongst the group of devices;

verify removal of the particular device with an existing device that is not the particular device within the group of devices, the existing device having the first permission; and remove the particular device from the group of devices, including:

revoking the scope of permission granted to a second device DID that is associated with the particular device;

deactivating the second device DID; and recording a first transaction associated with revoking the scope of permission granted to the second device DID in a distributed ledger.

13. The computer system of claim 12, wherein:

the scope of permission granted to the device group DID also includes a second permission to add new devices into the group of devices, and the first device DID is granted the second permission to add new devices into the group of devices.

14. The computer system of claim 13, wherein the computer-executable instructions are also executable by the processor to:

receive a request for adding a new device to the group of devices;

verify the new device with an existing device within the group of devices having the second permission; and add the new device into the group of devices, including:

deriving a new device DID;

associating the new device DID with the new device; and granting the new device DID the subset of the scope of permission.

15. The computer system of claim 14, wherein verifying the new device with the existing device within the group of devices comprises:

causing the request to be sent to at least one device within the group of devices; and receiving a notification from the at least one device indicating that the request is approved.

16. The computer system of claim 14, wherein the computer-executable instructions are also executable by the processor to record a second transaction associated with granting the new device DID the subset of the scope of permission in the distributed ledger.

17. The computer system of claim 12, wherein verifying removal of the particular device comprises:

causing a request to be sent to at least one permissioned existing device; and receiving a notification from the at least one permissioned existing device that the request is approved.

18. A method implemented in a computer system that includes a processor, for generating and associating a decentralized identifier (DID) for a group of one or more related devices, the method comprising:

generating a device group DID for a group of devices by generating a private key of the device group DID based on a seed and a first hardware identifier of at least one device in the group of devices, wherein generating the device group DID or a device DID comprises:

receiving a passphrase from a user;

obtaining a constant value associated with the computing system; and using the passphrase and the constant value as inputs of a hash function to generate the device group DID;

associating the device group DID with the group of devices;

for at least one corresponding device in the group of devices, deriving a device DID by generating a private key of the device DID based on a seed, a second hardware identifier of the corresponding device, and the device group DID; and associating the device DID with the corresponding device;

granting a scope of permission to the device group DID, including granting a first permission to add new devices into the group of devices;

in response to granting the scope of permission to the device group DID, granting the device DID a subset of the scope of permission, including granting the device DID the first permission to add new devices into the group of devices, as such the device group DID and the device DID is only linked to the device group DID or a corresponding device, and no personally identifiable information is directly associated with the device group DID or the device DID;

receiving a request for adding a new device to the group of devices;

verifying the new device with an existing device within the group of devices having the first permission, including:

causing the request to be sent to at least one device within the group of devices; and receiving a notification from the at least one device indicating that the request is approved; and adding the new device into the group of devices, including:

deriving a new device DID;

associating the new device DID with the new device; and granting the new device DID the subset of the scope of permission.

19. The method of claim 18, wherein adding the new device into the group of devices also includes recording a transaction associated with granting the new device DID the subset of the scope of permission in a distributed ledger.

20. The method of claim 18, wherein:

the scope of permission granted to the device group DID also includes a second permission to remove existing devices from the group of devices, and at least one of the device DID is granted the second permission to remove existing devices from the group of devices.

* * * * *